US010266457B2

(12) United States Patent
Spittle et al.

(10) Patent No.: US 10,266,457 B2
(45) Date of Patent: *Apr. 23, 2019

(54) BARK AND WOOD FIBER GROWING MEDIUM

(71) Applicant: PROFILE PRODUCTS L.L.C., Buffalo Grove, IL (US)

(72) Inventors: Kevin Scott Spittle, Vero Beach, FL (US); Gary Lane Bowers, Jonesborough, TN (US)

(73) Assignee: PROFILE PRODUCTS L.L.C., Buffalo Grove, IL (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/400,363

(22) Filed: Jan. 6, 2017

(65) Prior Publication Data

US 2017/0114276 A1 Apr. 27, 2017

Related U.S. Application Data

(63) Continuation-in-part of application No. 15/322,906, filed as application No. PCT/US2015/038312 on Jun. 29, 2015.

(60) Provisional application No. 62/018,640, filed on Jun. 29, 2014.

(51) Int. Cl.
*C05G 3/04* (2006.01)
*C09K 17/16* (2006.01)
*C09K 17/32* (2006.01)
*C09K 17/52* (2006.01)
*C05F 11/00* (2006.01)

(52) U.S. Cl.
CPC ............... *C05G 3/04* (2013.01); *C05F 11/00* (2013.01); *C09K 17/16* (2013.01); *C09K 17/32* (2013.01); *C09K 17/52* (2013.01)

(58) Field of Classification Search
None
See application file for complete search history.

(56) References Cited

U.S. PATENT DOCUMENTS

| 441,760 A | 12/1890 | Horrocks |
| 524,650 A | 8/1894 | Potter |
| 524,695 A | 8/1894 | Potter |

(Continued)

FOREIGN PATENT DOCUMENTS

| CN | 2223300 Y | 3/1996 |
| CN | 101096786 A | 1/2008 |

(Continued)

OTHER PUBLICATIONS

W.C. Fonteno et al., "Procedures for Determining Physical Properties of Horticultural Substrates Using the NCSU Promoter," North Carolina State University, NCSU Porometer Manual, 27 pages.

(Continued)

*Primary Examiner* — Wayne A Langel
(74) *Attorney, Agent, or Firm* — Brooks Kushman P.C.

(57) ABSTRACT

A growing medium comprising fibrous tree bark and fibrous wood components, wherein the fibers of the growing medium have an average length to width ratio, such that the growing medium has a dry bulk density of about 60 kg/m$^3$ or lower and wet bulk density of about 120 kg/m$^3$ or lower.

70 Claims, 10 Drawing Sheets

(56) References Cited

U.S. PATENT DOCUMENTS

| | | |
|---|---|---|
| 1,015,764 A | 1/1912 | Potter |
| 1,222,523 A | 4/1917 | Cary |
| 1,331,001 A | 2/1920 | Conrad |
| 1,610,096 A | 12/1926 | Jolly |
| 1,610,791 A | 12/1926 | Jolly |
| 1,629,068 A | 5/1927 | Cook |
| 2,157,684 A | 5/1939 | Williams |
| 2,757,150 A | 7/1956 | Heritage |
| 2,986,778 A | 6/1961 | Goodwin et al. |
| 2,989,252 A | 6/1961 | Babb |
| 2,995,434 A | 8/1961 | Burton |
| 3,051,398 A | 8/1962 | Babb |
| 3,139,650 A | 7/1964 | Diesel |
| 3,192,571 A | 7/1965 | Halleux |
| 3,208,107 A | 9/1965 | Kotter |
| 3,251,096 A | 5/1966 | Rapp |
| 4,031,003 A | 6/1977 | Husky |
| 4,057,876 A | 11/1977 | Sawyer |
| 4,109,875 A | 8/1978 | Condarco et al. |
| 4,192,042 A | 3/1980 | Jagst |
| 4,202,079 A | 5/1980 | Prather |
| 4,300,267 A | 11/1981 | Winch et al. |
| 4,458,381 A | 7/1984 | Van Doorn et al. |
| 4,479,285 A | 10/1984 | Ragan |
| 4,548,131 A | 10/1985 | Williams |
| 4,625,368 A | 12/1986 | Leifeld |
| 4,662,031 A | 5/1987 | Feiks et al. |
| 4,723,343 A | 2/1988 | Bernhardt et al. |
| 4,756,059 A | 7/1988 | Temburg |
| 4,766,648 A | 8/1988 | Kerley |
| 4,788,790 A | 12/1988 | Zeager |
| 4,796,335 A | 1/1989 | Kranefeld et al. |
| 4,932,156 A | 6/1990 | Underwood |
| 4,993,119 A | 2/1991 | Roberson |
| 5,121,841 A | 6/1992 | Harrington et al. |
| 5,192,587 A | 3/1993 | Rondy |
| 5,343,597 A | 9/1994 | Pinto et al. |
| 5,513,805 A | 5/1996 | Fisher et al. |
| 5,537,809 A | 7/1996 | Blalock |
| 5,617,614 A | 4/1997 | Locatelli et al. |
| 5,845,367 A | 12/1998 | Vezzoli et al. |
| 6,195,841 B1 | 3/2001 | Mascheretti et al. |
| 6,327,745 B1 | 12/2001 | Franke |
| 6,349,499 B1 | 2/2002 | Spittle |
| 6,393,665 B1 | 5/2002 | Foster et al. |
| 6,442,803 B1 | 9/2002 | Foster et al. |
| 6,539,585 B1 | 4/2003 | Anthony |
| 6,615,454 B1 | 9/2003 | Anthony |
| 6,740,342 B1 | 5/2004 | Hulst et al. |
| 6,773,545 B2 | 8/2004 | Tanner et al. |
| 6,786,438 B2 | 9/2004 | Winn |
| 6,800,319 B1 | 10/2004 | Hulst et al. |
| 7,032,273 B2 | 4/2006 | Pinto |
| 7,752,715 B2 | 7/2010 | Morgner et al. |
| 7,797,798 B2 | 9/2010 | Rosemann |
| 8,567,117 B2 | 10/2013 | Spittle |
| 8,984,805 B2 | 3/2015 | Shpak et al. |
| 2002/0189053 A1 | 12/2002 | Pasini et al. |
| 2003/0056873 A1 | 3/2003 | Nakos et al. |
| 2005/0076564 A1 | 4/2005 | Castleberry |
| 2006/0207064 A1 | 9/2006 | Minter |
| 2007/0186463 A1 | 8/2007 | Lougheed |
| 2008/0280760 A1* | 11/2008 | Oliver ............ C05F 11/00 504/101 |
| 2009/0101294 A1 | 4/2009 | Young |
| 2010/0155513 A1 | 6/2010 | Brick et al. |
| 2013/0075504 A1 | 3/2013 | Beaudet et al. |
| 2013/0075509 A1 | 3/2013 | Beaudet et al. |
| 2015/0225304 A1 | 8/2015 | Donze et al. |
| 2015/0368165 A1* | 12/2015 | Tournayre ............ C05F 11/00 71/23 |
| 2016/0138201 A1 | 5/2016 | Bocht |
| 2017/0305802 A1 | 10/2017 | Tournayre et al. |
| 2018/0057966 A1 | 3/2018 | Spittle et al. |

FOREIGN PATENT DOCUMENTS

| | | |
|---|---|---|
| CN | 202543422 U | 11/2012 |
| CN | 202730348 U | 2/2013 |
| DE | 24 32 432 | 1/1975 |
| DE | 32 35 452 A1 | 3/1984 |
| DE | 10360635 A1 | 7/2005 |
| EP | 0147349 A1 | 7/1985 |
| EP | 1491666 A1 | 12/2004 |
| EP | 1914344 A1 | 4/2008 |
| GB | 437242 | 10/1935 |
| GB | 1 337 694 | 11/1973 |
| WO | 2006/055715 A2 | 5/2006 |

OTHER PUBLICATIONS

Related U.S. Appl. No. 15/322,921, filed Dec. 29, 2016. 44 pages (WO2016/003905) "Growing Medium and Mulch Fiber Opening Apparatus.".

Related U.S. Appl. No. 15/322,899, filed Dec. 29, 2016. 24 pages (WO2016/003903) "Naturally Dyed Mulch and Growing Media".

IPR & International Search Report, PCT/US2015/038315, dated Jun. 29, 2015, 16 pages.

IPR & International Search Report, PCT/US2015/038312, dated Jun. 29, 2015, 10 pages.

IPR & International Search Report, PCT/US2015/038318, dated Jun. 29, 2015, 11 pages.

IPR & Search Report PCT/US18/12649, dated May 7, 2018, (13 pages).

EP Search Report, Application No. EP 15 81 5634.9 (PCT/US2015/038318, dated May 14, 2018 (4 pages).

Maatjie, MA, "Growth, Yield and quality of Hydroponically Grown Tomatoes as Affected by Different Particle Sizes of Sawdust", 2015. University of South Africa dissertation; figure 4-6; pp. 13, 30.

Office Action, related U.S. Appl. No. 15/322,906; dated Jul. 2, 2018.

Office Action, related U.S. Appl. No. 15/322,921; dated Jun. 15, 2018.

Chinese Office Action dated Nov. 2, 2018, Application No. 201580035717.2.

European Office Action dated Jun. 13, 2018, Application No. 15815634.9.

Australian Office Action dated May 9, 2018, Application No. 2015284367.

Final Office Action, related U.S. Appl. No. 15/322,906, dated Jan. 30, 2019.

Final Office Action, related U.S. Appl. No. 15/322,921, dated Feb. 5, 2019.

* cited by examiner

BARK AND WOOD FIBER GROWING MEDIUM

CROSS-REFERENCE TO RELATED APPLICATIONS

This application is a continuation-in-part of U.S. patent application Ser. No. 15/322,906, filed Dec. 29, 2016, which is a National Stage Application to PCT/US2015/038312, filed Jun. 29, 2015, which claims priority to U.S. provisional application Ser. No. 62/018,640, filed Jun. 29, 2014, the disclosures which are incorporated in their entirety by reference herein.

TECHNICAL FIELD

The present invention is related to a substrate that can be used as a replacement for peat in a growing medium.

BACKGROUND

Peat is a widely used organic material for agricultural and horticultural applications. Peat is used to improve soil structure, retain moisture, and increase acidity. Peat is also frequently added into agricultural mixes to increase water-holding capacity and/or to decrease weight. Since peat is typically harvested from natural sources such as mires and peat lands, mining of peat presents a threat to fragile peat bog ecosystems by disrupting wildlife habitats and endangering endemic species. Peat lands also contribute to healthy watersheds and aid in providing safe drinking water for human populations. Besides their water filtration capabilities, peat bogs are effective in flood prevention and serve as a very efficient carbon sink. Thus, there is a desire to preserve peat lands and to decrease commercial use of peat.

Various substitutes for peat have been suggested, for example, coir or coconut fiber derived from the husk of the coconut fruit, wood-based substrates, or rice hulls. Yet, all of these substitutes suffer from a variety of drawbacks. For example, neither substitute provides a satisfactory volume of air space. The substitutes also have a relatively high dry and wet bulk density, thus contributing to a relatively high weight of products which include the substitute. Additionally, some of the substitutes may be, just like peat, available only on a limited basis, and their harvesting may have environmental implications.

Accordingly, there is a need for peat replacements that do not negatively impact the environment and which provide desirable properties to a growing medium.

SUMMARY OF THE INVENTION

The present invention solves one or more problems of the prior art by providing a mulch composition or growing medium including fibrous wood components. The mulch composition or growing medium is made by a method wherein fibrous wood components are combined together to form an initial composition which is heated to a temperature greater than about 300° F. (about 149° C.) under steam in a pressurized vessel and fiberized in a refiner to form the fibrous growing medium. The resultant fibrous mulch composition or growing medium has total porosity of 88 volume % or more. The mulch composition or growing medium has a dry bulk density of about 80 kg/m$^3$ or lower and wet bulk density of about 120 kg/m$^3$ or lower. The mulch composition or growing medium is ideal as a standalone mulch composition or growing medium as well as an additive to peat-based substrates, and to amend other existing substrates. The mulch composition or growing medium can also be used to displace at least a portion of peat, composted pine bark, perlite, vermiculite, sand, rock wool, compost, animal manure, rice hulls, hardwood bark, softwood bark, coir, the like, or a combination thereof in various growing mixes or substrates.

DETAILED DESCRIPTION

Figure 1:
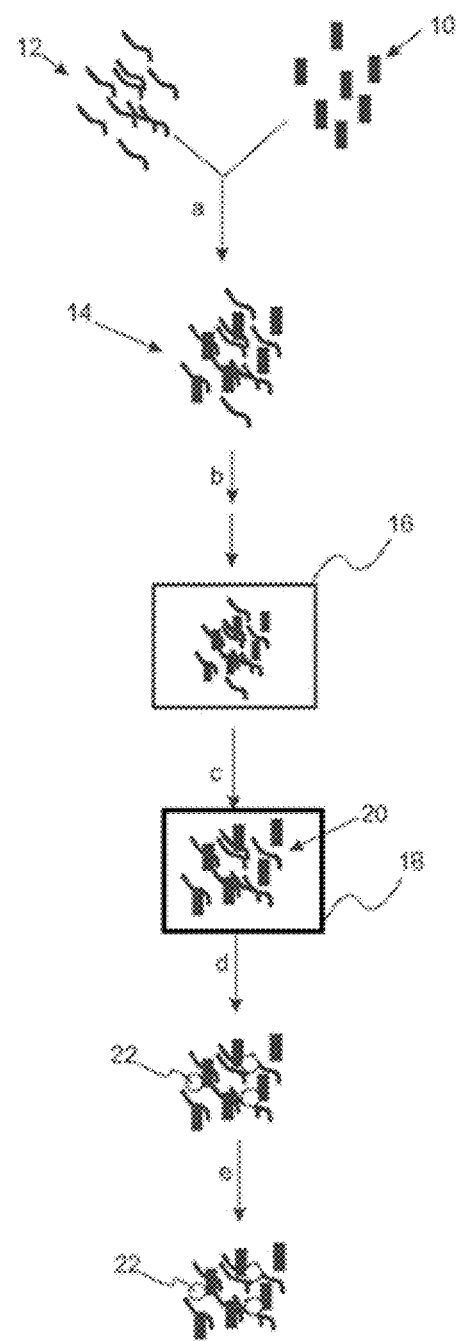
FIG. 1 provides a schematic flowchart illustrating the formation of the growing medium.
Figure 2A:
FIGS. 2A and 2B show stereoscopic images of coir particles of #16 sieve and #50 sieve, respectively.
Figure 2B:
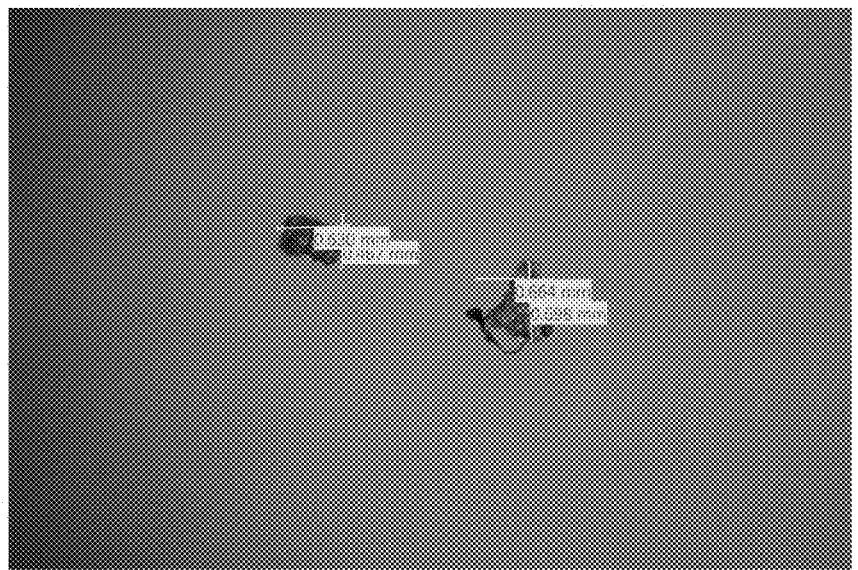
Figure 3A:
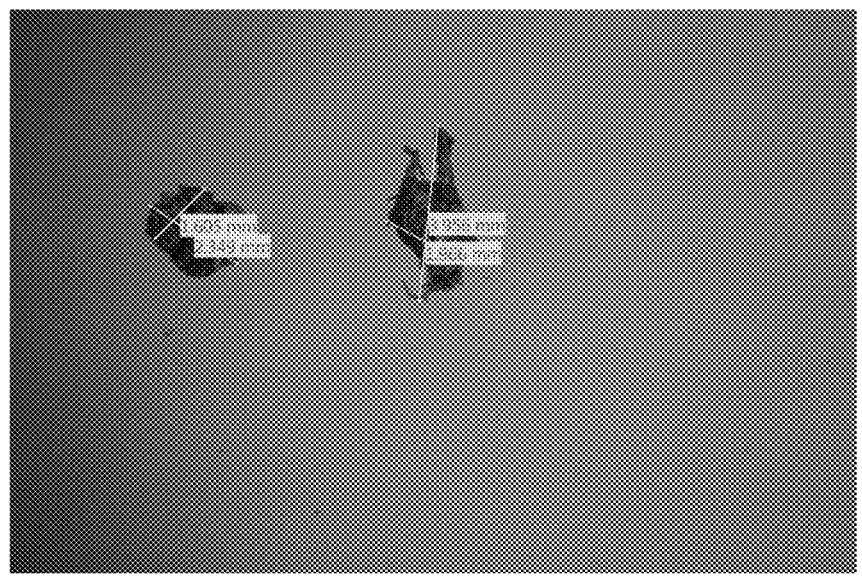
FIGS. 3A and 3B show stereoscopic images of peat particles of #16 sieve and #50 sieve, respectively.
Figure 3B:
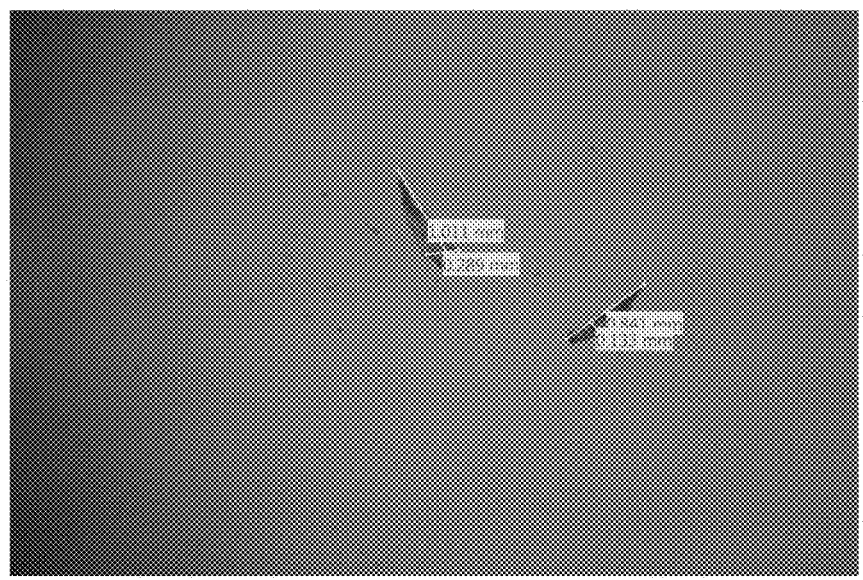
Figure 4A:
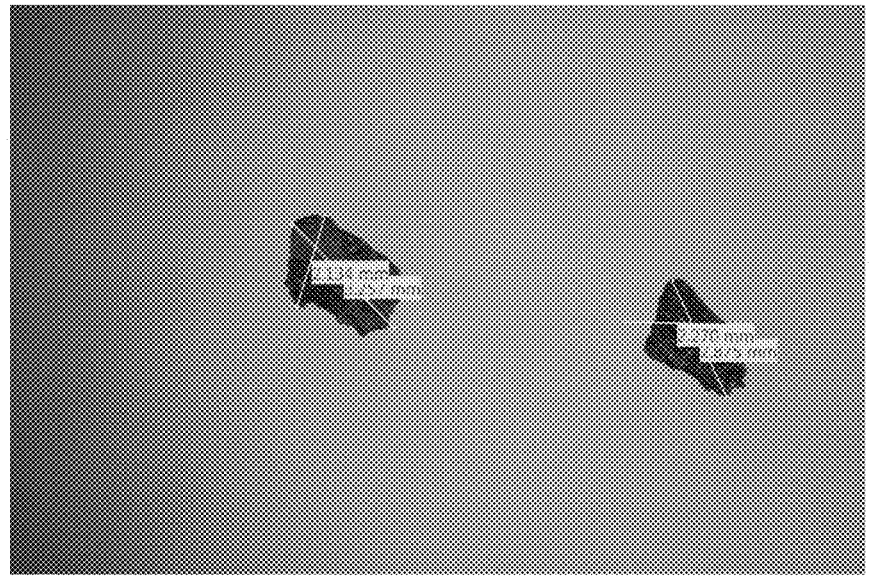
FIGS. 4A and 4B show stereoscopic images of bark particles of #16 sieve and #50 sieve, respectively.
Figure 4B:
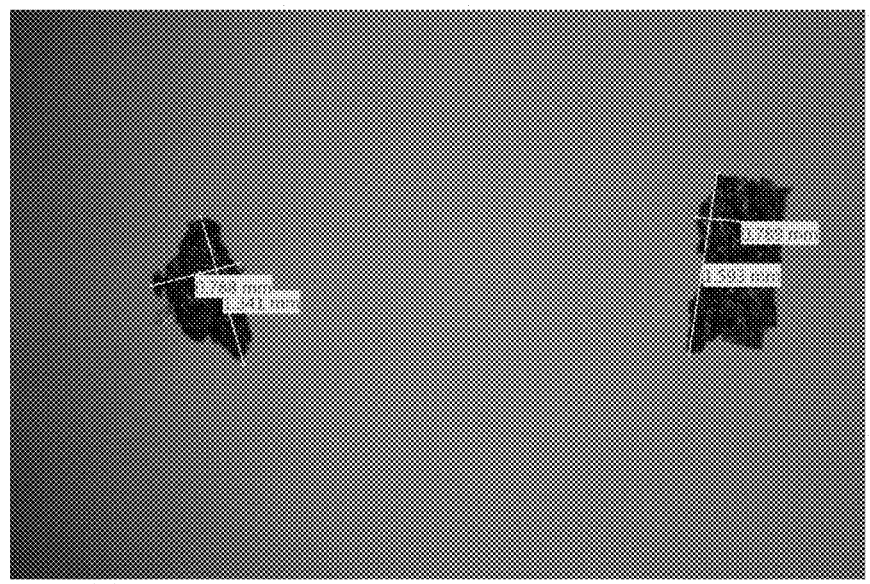
Figure 5A:
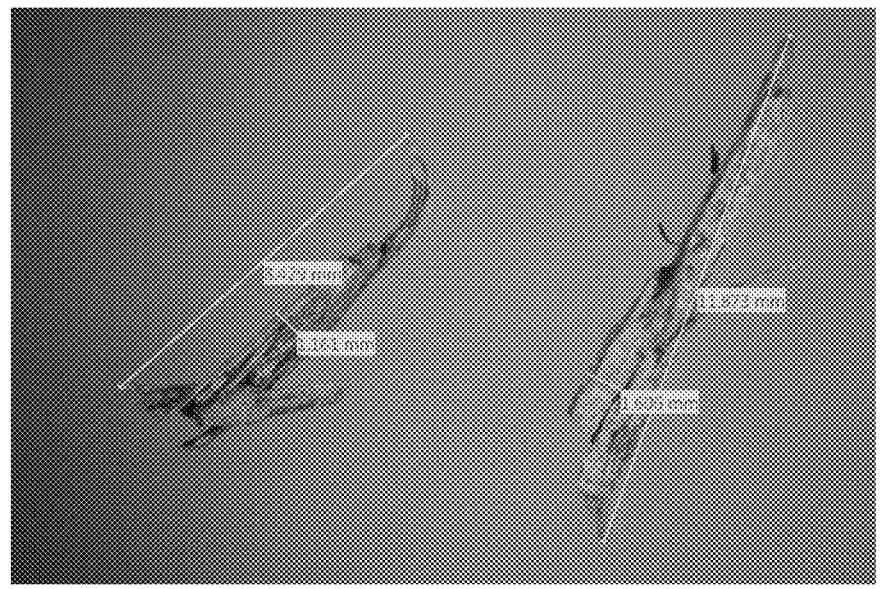
FIGS. 5A and 5B show stereoscopic images of Pine Tree Substrate (PTS) particles of #16 sieve and #50 sieve, respectively.
Figure 5B:
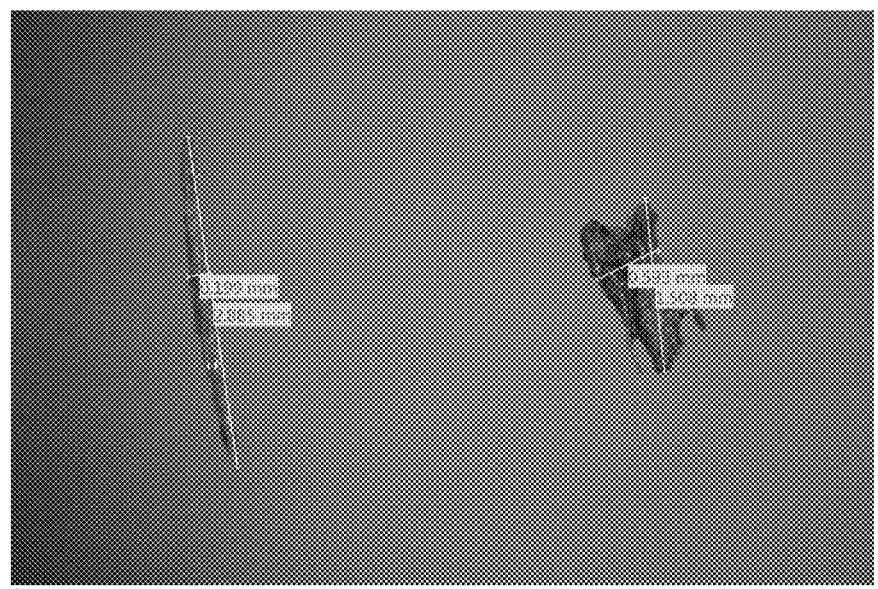
Figure 6A:
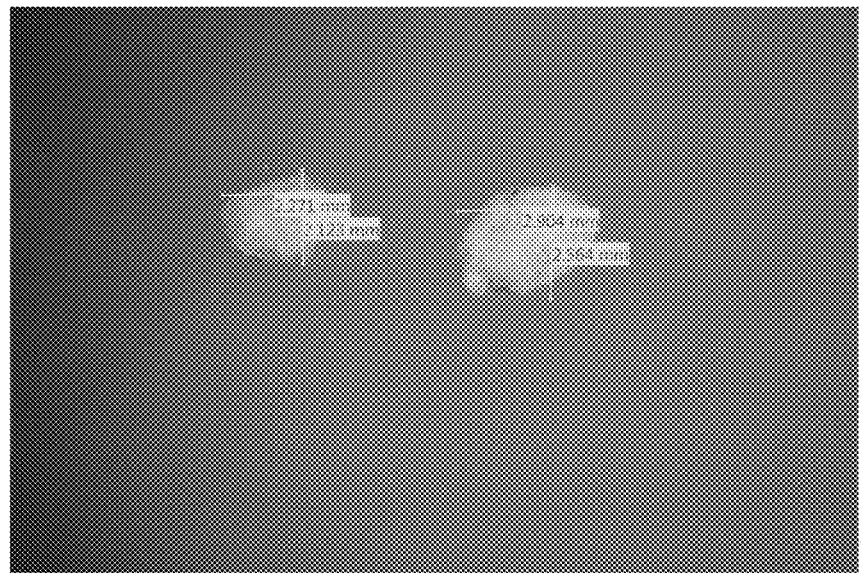
FIGS. 6A and 6B show stereoscopic images of perlite particles of #16 sieve and #50 sieve, respectively.
Figure 6B:
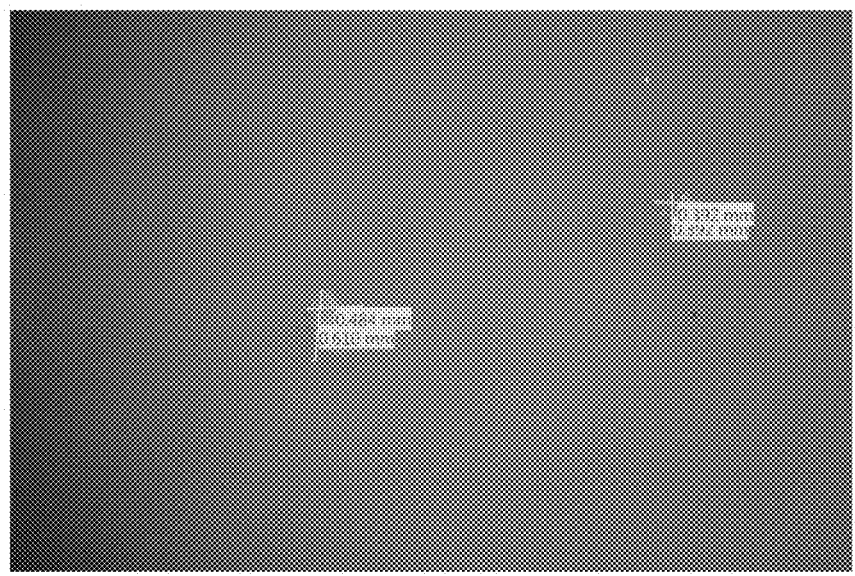
Figure 7A:
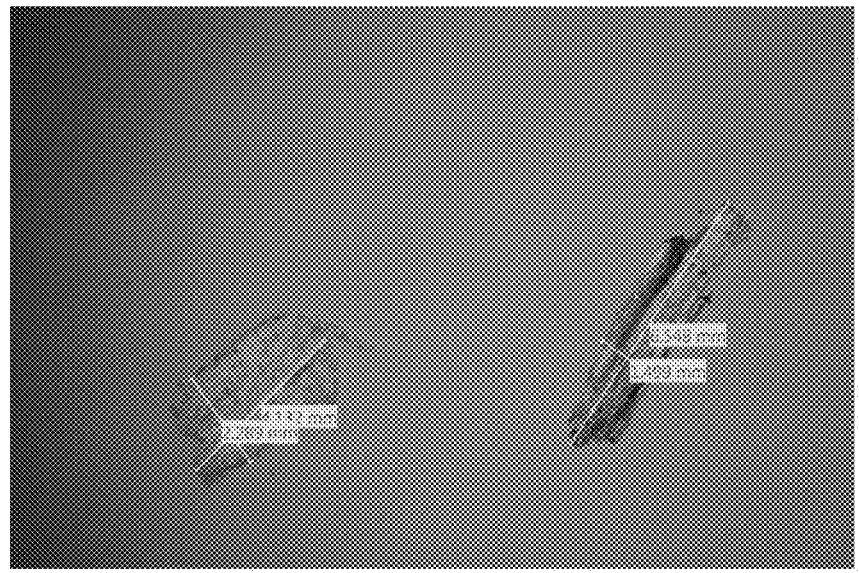
FIGS. 7A and 7B show stereoscopic images of Whole Tree Substrate (WTS) particles of #16 sieve and #50 sieve, respectively.
Figure 7B:
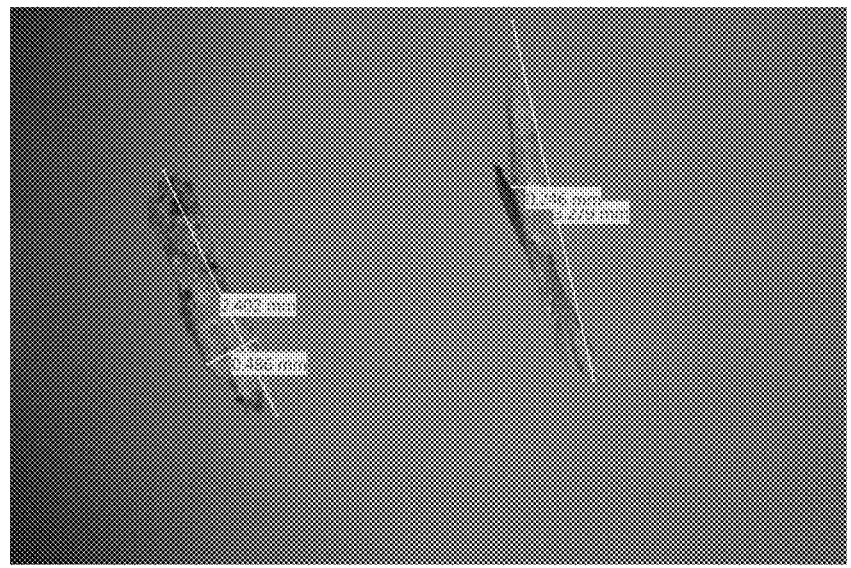
Figure 8A:
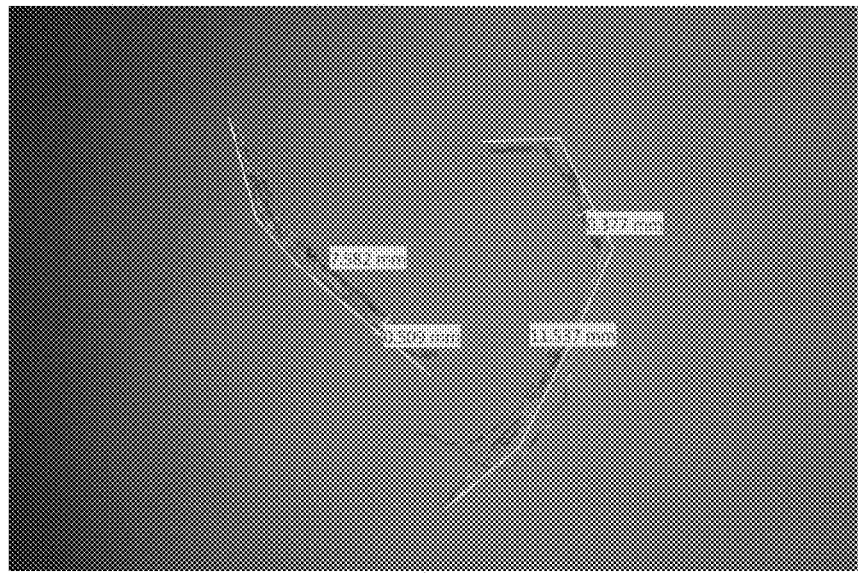
FIGS. 8A and 8B show stereoscopic images of growing medium fibers of #16 sieve and #50 sieve, respectively.
Figure 8B:
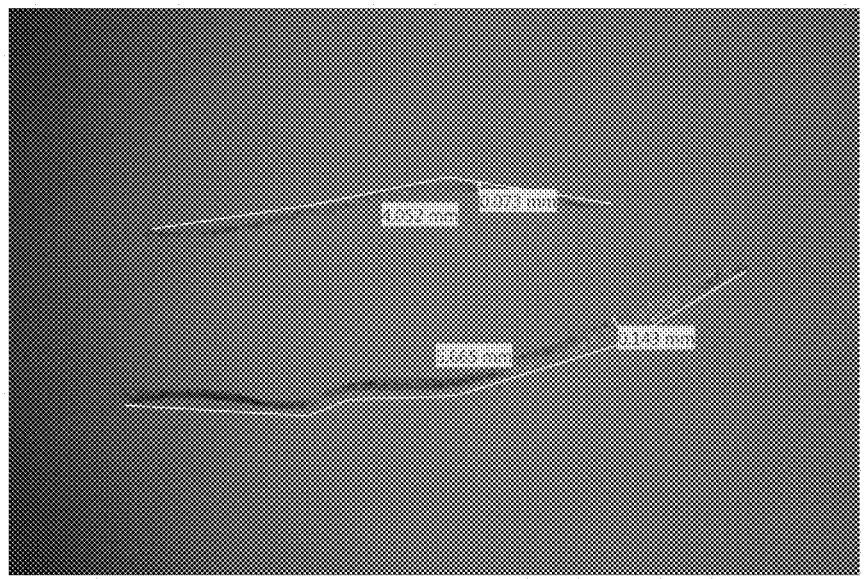

As required, detailed embodiments of the present invention are disclosed herein; however, it is to be understood that the disclosed embodiments are merely exemplary of the invention that may be embodied in various and alternative forms. The figure is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "dominant wavelength" refers to a way of describing polychromatic light mixtures in terms of monochromatic light that evokes an identical perception of hue. It is determined on the International Commission on Illumination (CIE)'s color coordinate space by a straight line between the color coordinates for the color of interest and the coordinates for the illuminate. The intersection at the perimeter of the coordinate space nearest the color of interest is the dominant wavelength.

The term "growing medium" (GM) refers to a substrate, specifically a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The term "mulch" or "mulch composition" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device. The terms "growing medium" and "mulch composition" are used interchangeably.

The mulch composition or growing medium may include one or more wood components. The term "wood components" or "fibrous wood components" refers to wood chips, wood fiber, bark, needles, or their combination. The wood components may be derived from coniferous and deciduous trees and may be prepared by any convenient manner, for example as disclosed for wood fibers in U.S. Pat. No. 2,757,150. Any type of wood components may be used, but wood components of the softwood varieties such as yellow poplar, cedar such as Western red cedar, fir such as Douglas fir, California redwood, and particularly pine such as *Ponderosa*, Sugar, White, and Yellow varieties of pine are preferred. For example, fibrous wood components may refer to fibrous pine tree wood components including just fibrous pine tree wood or fibrous pine tree wood as well as fibrous tree bark, needles, chips, or a combination thereof.

The mulch composition or growing medium, and in particular, a fibrous mulch composition or growing medium, may include about 5 to about 95 weight % of tree bark mixed with about 95 to about 5 weight % of wood components, based on the total weight of the mulch composition or growing medium. The mulch composition or growing medium may include 100 weight % fibrous pine wood components. The mulch composition or growing medium may include about 10 weight % of tree bark and about 90 weight % of wood components, based on the total weight of the mulch composition or growing medium. The mulch composition or growing medium may include about 20 to about 70 weight % of tree bark and about 30 to about 80 weight % of wood components, based on the total weight of the mulch composition or growing medium. Alternatively, the mulch composition or growing medium may include about 50 to about 60 weight % of tree bark and about 40 to about 50 weight % of wood components, based on the total weight of the mulch composition or growing medium. The mulch composition or growing medium may include about 90 weight % of tree bark and about 10 weight % of wood components, based on the total weight of the mulch composition or growing medium. The mulch composition or growing medium may further include about 0 to about 10 weight % or more of additional components, based on the total weight of the mulch composition or growing medium, as set forth below. Throughout the entire disclosure, unless otherwise specified, all weight percentages of components are based on the total weight percent of the components in the growing medium which is 100% by weight. In addition, unless otherwise specified, all volume percentages of components are based on the total volume percent of the components in the growing medium which is 100% by volume.

The tree bark may contain one or more pigments or pigment precursors that give color to its layers. Some bark (for example *eucalyptus* bark and sycamore bark) may be light-colored initially, but darken after its pigments are oxidized. Pigments included in the bark may include, but are not limited, to tannins such as tannic acid (e.g., quercitannic acid and gallotanic acid). Non-limiting examples of useful tree barks containing one or more pigments are named above. In addition, during heat treatment, additional pigments may develop in the bark, in the wood, or both, which contribute to the color of the mulch product or the growing medium. This is what is meant by "pigment precursors."

The amount, age, moisture, and/or other properties of the bark used may influence hue and/or intensity of the imparted color. For example, low quantities of bark may result in light brown color of the mulch composition or growing medium while high quantities of bark may result in dark brown color. At least about 1 weight %, about 3 weight %, preferably about 5 weight % of bark may be needed to obtain mulch or growing medium dyed by the bark pigments. To color-change the mulch or growing medium, about 1 to about 99 weight % of bark may be included in the initial composition, based on the total weight of the initial composition. Additional bark may be added during the process of producing mulch or growing medium so that the final color of the fiber product may be adjusted to the desired hue. Concerning the age of bark, the bark from the most recently debarked trees generally provides for the most intense color change of the wood components. Moisture of the bark may be about 30 to 60%, measured by ASTM D4442-07, to provide adequate color change of the wood components.

The mulch composition or growing medium may have a color with a dominant wavelength from about 510 nm to about 780 nm, about 590 nm to about 770 nm, about 620 nm to about 760 nm, or about 675 nm to about 750 nm relative to a white illuminate. The mulch composition or growing medium may have a red to brown to black color. The mulch composition or growing medium may have a yellow, orange, gray, or green color. The mulch composition or growing medium may have hsl color coordinates such that the "h value" (hue) is from about 25 to about 45, the "s value" (saturation) is from about 20 to about 100, and the "l value" (lightness) is less than about 50. The l value may be from about 0 to about 25.

The mulch composition or growing medium may further include a non-permanent dye that is eventually removed or that eventually fades after the composition is applied. Preferably, the non-permanent dye is non-toxic so that no toxic chemicals are leached from the mulch composition or growing medium into the environment. The non-permanent dye may comprise natural and/or synthetic compounds. The non-permanent dye may comprise compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, or seed. Exemplary sources of plant dyestuffs include tree varieties named above; vegetables such as carrots, beetroot, red cabbage, artichoke, spinach, celery; fruit such as blueberries, pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, *camellia*, snapdragon, nettle, milkweed, peony, Black-eyed Susan, *hydrangea*, chamomile, alfalfa, *crocus*, marigold, or the like. Exemplary mineral-based dyestuffs include iron oxide and carbon black. Exemplary useful non-permanent dye includes ELCOMENT BLACK 7822 commercially available from Greenville Colorants. Another exemplary type of non-permanent dye may include green pigments.

The non-permanent dye may be combined with the bark alone and/or with the components alone before the initial composition is formed before step a), with the initial composition in step a), with the mulch composition or growing medium in step b), in step c), in step d), in step e), after step e), or in more than one step. At least about 0.1 to about 2 weight % of non-permanent dye may be added to the initial composition to cause color change of the wood fiber, based on the total weight of the initial composition. About 0.1 to 15 weight % or more, about 2 to 10 weight %, about 3 to 7 weight % of the non-permanent dye may be added to the initial composition, based on the total weight of the initial composition. At least about 2-40 pounds (0.9-18 kg) of non-permanent dye may be added per ton of the final mulch or growing medium to achieve color change.

Typically, the removable non-permanent dye imparts a darker color on the mulch composition or growing medium than when the non-permanent dye is absent therein. The non-permanent dye may be washed away after several days (about 1 to about 30 days or after more extensive time period) after being applied in the field. The non-permanent dye may fade away or begin to fade away (e.g., from exposure to sunlight or other environmental conditions) after several days such as about 1 to about 30 days or after more extensive time period after being applied in the field.

The mulch composition or growing medium with the non-permanent dye may have a color with a dominant wavelength from about 400 nm to about 780 nm, about 510 nm to about 770 nm, about 590 nm to about 760 nm, or about 620 nm to about 750 nm relative to a white illuminate. The color of the mulch composition or growing medium including the non-permanent dye may vary. The fiber-containing product with the non-permanent dye may have a red to brown to black color. But other colors such as green, blue, yellow, orange, purple, or gray hues are contemplated as well. The type and amount of dye determine intensity of the color. Typically, the removable non-permanent dye imparts a darker color on the fiber-containing product than when the non-permanent dye is absent therefrom. Alternatively, the fiber-containing product with the non-permanent dye may have a lighter color than when the non-permanent dye is absent therefrom. The fiber-containing product may have a lower "h value" than the fiber-containing product without the non-permanent dye. The mulch composition or growing medium may have hsl color coordinates such that the "h value" (hue) is from about 10 to about 40, the "s value" (saturation) is from about 20 to about 100, and the "1 value" (lightness) is less than about 50. The 1 value may be from about 0 to about 25.

The mulch or growing medium may be dyed by bark pigments and/or by one or more natural non-permanent dyes in order to comply with organic standards and secure a certificate from the Organic Materials Review Institute (OMRI).

The dyed fiber produced by the method described above and the resulting mulch or growing medium composition may have a light-fastness, in order of increasing preference, of at least up to 1 day, 5 days, 10 days, 20 days, 1 month, 2 months, or 3 months or more, with minimal fading, measured according to ASTM D4303-99. The term "minimal fading" refers to any visually discernable extent of fading. The light-fastness of the dyed mulch or growing medium may be about 1 to 120 days, about 5 to 90 days, about 10 to 30 days.

As set forth above, the mulch composition or growing medium may include tree bark. The term "bark" refers to a plurality of stem tissues including one or more of cork (phellum), cork cambium (phellogen), phelloderm, cortex, phloem, vascular cambium, and xylem. Examples of useful tree barks include, but are not limited to, bark from pine, oak, walnut, mahogany (*Swietenia macrophylla, Swietenia mahagoni, Swietenia humilis*), hemlock, Douglas fir, alder, elm, birch, Sitka spruce, sycamore, and the like, and combinations thereof. Pine tree bark is found to be particularly useful in the growing medium.

The input bark and/or wood components may be preprocessed in a variety of ways such as cut so that the dimensions of the input wood components and/or bark pieces are about 0.25 inches (0.64 cm) to about 6 inches long and wide, about 1 inch (2.54 cm) to about 4 inches (10.2 cm) long and wide, about 2 inches (5 cm) to about 3 inches (7.6 cm) long and wide. Preferably, the size of the wood components and/or bark pieces is about 2×2 inches (5×5 cm).

The initial density of the wood components and/or bark before the wood components and/or bark are formed into a mulch composition or growing medium by the process described below may be about 15 lbs/ft$^3$ (240.28 kg/m$^3$) to about 35 lbs/ft$^3$ (560.65 kg/m$^3$).

The fibrous mulch composition or growing medium may be combined with additional components. Examples of such additional components include, but are not limited to, fertilizer(s), macronutrient(s), micronutrient(s), mineral(s), binder(s), natural gum(s), interlocking manmade fiber(s), and the like, and combinations thereof. In general, these additional components in total are present in an amount of less than about 10 weight % of the total weight of the mulch composition or growing medium. More preferably, the additional components in total are present in an amount from about 1 to about 15 weight % of the total weight of the mulch composition or growing medium. Additionally, soil may be present in an amount of about 20 weight % or less, about 15 weight % or less, or about 5 weight % or less of the total weight of the mulch composition or growing medium. The soil may be present in an amount of about 0.1 to about 20 weight % of the total weight of the mulch composition or growing medium. Soil may also be absent from the mulch composition or growing medium.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers having lesser nutritional value, but providing other advantages such as improving aeration, water absorption, or being environmental-friendly may be used. The source of such fertilizers may be, for example, animal waste or plant waste.

Nutrients are well-known and may include, for example, macronutrient, micronutrients, and minerals. Examples of macronutrients include calcium, chloride, magnesium, phosphorus, potassium, and sodium. Examples of micronutrients are also well-known and include, for example, boron, cobalt, chromium, copper, fluoride, iodine, iron, magnesium, manganese, molybdenum, selenium, zinc, vitamins, organic acids, and phytochemicals. Other macro- and micronutrients are well known in the art.

The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymer analogs, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied growing media.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binder may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

With reference to FIG. 1, a schematic flowchart illustrating the formation of the mulch composition or growing medium is provided. As can be seen in FIG. 1, in step a), an initial composition 14 is formed by combining tree bark 10 and/or wood components 12 together to form the initial composition 14. The wood components 12 may include wood chips, wood fiber, needles, or a combination thereof; yet, preferably, the wood components are wood chips. Typically, about 1 to about 99, 90, 85, 80, 75, 70, 65, 60, 55, 50, 45, 40, 35, 30, 25, 20, 15, 10, 5 weight % of tree bark, such as pine, is combined with about 99, 95, 90, 85, 80, 75, 70, 65, 60, 55, 50, 45, 40, 35, 30, 25, 20, 15, 10, 5, 1 weight % of wood components, based on the total weight of the mulch composition or growing medium, in step a). Alternatively, about 5 to about 95 weight % of tree bark is combined with about 95 to about 5 weight % of wood components, based on the total weight of the mulch composition or growing medium, in step a). Alternatively, still, about 20 to about 70 weight % of tree bark is combined with about 30 to about 80 weight % of wood components, based on the total weight of the mulch composition or growing medium, in step a). In another embodiment, about 50 to about 60 weight % of tree bark is combined with about 40 to about 50 weight % of wood components, based on the total weight of the mulch composition or growing medium, in step a). In yet another embodiment, the initial composition 14 may be substantially bark free and contain about 100 weight % of wood components, based on the total weight of the mulch composition or growing medium.

Based on the total volume of the mulch composition or growing medium, about 0.1, 0.5, 1, 2, 3, 4, 5, 6, 7, 8, 9, 10, 12, 14 16, 18, 20, 25, 30, 35, 40, 45, 50, 55, 60, 65, 70, 75, 80, 85, 90 volume % of tree bark, such as pine, may be combined with the remainder of wood components in step a).

In step b), the initial composition 14 is heated to an elevated temperature to kill microbes in a pressurized vessel 16. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in$^2$ (2.4 kg/cm$^2$) to about 120 lbs/in$^2$ (8.4 kg/cm$^2$) or about 50 lbs/in$^2$ (3.5 kg/cm$^2$) to about 100 lbs/in$^2$ (7.0 kg/cm$^2$). For example, the heating step may be conducted at a temperature of about 300° F. (149° C.) for about 3 minutes at about 80 lbs/in$^2$ (5.6 kg/cm$^2$). For example, the heating step may be conducted at a temperature of about 300° F. (149° C.) for about 3 minutes. The heating step results in a preferably substantially sterile mulch composition or growing medium such that the mulch composition or growing medium is free from bacteria or other living organisms. The steam flow rate during the heating step may be from about 4000 lbs/hour (1814 kg/hour) to about 15,000 lb/hour (6803 kg/hour).

An example of a pressurized vessel and related process for step b) is disclosed in U.S. Pat. No. 2,757,150, which has been incorporated by reference, in which wood chips are fed to a pressurized steam vessel which softens the chips. Any type of wood chip may be used in this process, but wood chips of the softwood varieties such as yellow poplar, and particularly pine, are preferred.

In step c), the initial composition 14 is processed through a refiner 18 to form the mulch composition or growing medium 20. The refiner 18 may use a plurality of disks to obtain the mulch composition or fibrous growing medium 20. The refiner 18 may use two or more disks, one of which is rotating, to separate wood fibers from each other as set forth in U.S. Pat. No. 2,757,150, the entire disclosure of which is hereby incorporated by reference. The refiner 18 is usually operated at a lower temperature than the temperature used in step b). The refiner 18 may be operated at a temperature in the range of about 70° F. (21° C.) to about 400° F. (204° C.), about 150° F. (66° C.) to about 350° F. (176° C.), about 200° F. (93° C.) to about 300° F. (148° C.). The refiner 18 may be operated under steam. The refiner 18 may be operated at atmospheric pressure or elevated pressures such as pressures of about 50 lb/in$^2$ (3.5 kg/cm$^2$) or lower to about 100 lb/in$^2$ (7.0 kg/cm$^2$). Some of the additional components 22 may be added during step c) such as a dye or a surfactant.

In step d), the mulch composition or growing medium 20 is dried at temperatures of about 400° F. (204° C.) to about 600° F. (316° C.) for the time sufficient to reduce the moisture content of the mulch composition or growing medium 20 to a value less than about 45 weight %, less than about 25 weight %, or less than about 15 weight %, based on the total weight of the mulch composition or growing medium 20. The drying step may be about 1 to 10 seconds long, about 2 to 8 seconds long, about 3 to 5 seconds long. The drying step may be longer than 10 seconds. Exemplary equipment for drying of the mulch composition or growing medium 20 in step d) may be a flash tube dryer capable of drying large volumes of mulch composition or growing medium 20 in a relatively short length of time due to the homogeneous suspension of the particles inside the flash tube dryer. While suspended in the heated gas stream, maximum surface exposure is achieved, giving the growing medium uniform moisture. The moisture content of the mulch composition or growing medium 20 may be from about 10 to about 50 weight %, about 20 to about 40 weight %, about 25 to about 35 weight % of the total weight of the mulch composition or growing medium 20.

In an optional step e), the mulch composition or growing medium 20 is further refined, and the additional components 22 set forth above may be added.

As was stated above, the mulch composition or growing medium may be used as a stand-alone mulch composition or growing medium. Alternatively, the mulch composition or growing medium may be added to a conventional mulch composition, growing medium, growing mix, or substrate to replace at least partially one or more components. The mulch composition or growing medium may displace peat, composted pine bark, perlite, vermiculite, sand, rock wool, compost, animal manure, rice hulls, hardwood bark, softwood bark, coir, other organic materials such as composted organic matter, the like, or a combination thereof. The mulch composition or growing medium may displace, in order of increasing preference, about 0.5% or more, 1% or more, 5% or more, 10% or more, 15% or more, 20% or more, 25% or more, 30% or more, 40% or more, 45% or more, 50% or more, 60% or more, 70% or more, 80% or more, 90% or more, 95% or more, or 99% or more of at least one of the components named above in a growing mix, based on the total weight of the mulch composition or growing mix. The mulch composition or growing medium may replace about 1 to 99, 10 to 95, 20 to 80, 30 to 70, 40 to 50 weight % of one or more components in the conventional mulch composition or growing medium, based on the total weight of the mulch composition or growing medium. The mulch composition or growing medium may replace about 1 to 99, 2 to 95, 5 to 87, 7 to 85, 10 to 80, 15 to 75, 20 to 70, 25 to 65, 30 to 60, 25 to 55, 30 to 50, 35 to 45, 38 to 42 volume % of one or more components in the conventional mulch composition or growing medium, based on the total volume of the mulch composition or growing medium. An exemplary conventional growing mix may contain, based on the total weight of the growing mix, about 80 weight % of peat and 20 weight % of perlite, which is being added to create air space for the peat. An alternative example, the substrate contains 70 weight % peat and 30 weight % growing medium. Yet another example substrate contains 50 weight % peat and 50 weight % growing medium. In a yet alternative embodiment, the substrate contains 30 weight % peat and 70 weight % growing medium. The growing medium of the present invention may replace the perlite entirely and replace at least about 50 weight % of the peat. The resulting growing medium is thus environmentally advantageous as it contains only a relatively low amount of peat and more economical than the conventional growing mix due to replacement of perlite. The resulting growing medium also provides a better balance of air and water retention than the peat-perlite and other conventional growing mixes.

Table 1 below illustrates the benefit of combining the growing medium having a bulk density from about 1.2 lbs/ft$^3$ (19.2 kg/m$^3$) to about 1.7 lbs/ft$^3$ (27.0 kg/m$^3$) with peat having a bulk density from about 7.7 (123.3 kg/m$^3$) to about 11.5 lbs/ft$^3$ (184.2 kg/m$^3$). The higher the ratio of growing medium, the lower the resulting combined bulk density and the greater the resulting recoverable volume. Peat is the primary component used in soiless substrates. Yet, due to its weight, up to about 50% of the delivery cost of peat is due to freight or transportation costs. The introduction of the growing medium into the peat substantially increases the volume of a peat soiless substrate while reducing the freight or transportation cost.

volume of air space is important for root systems and plants in general, as without oxygen, roots cannot grow and absorb water or minerals. The more oxygenated the roots are, the more efficient the plants become in converting sugars into energy for plant growing. Likewise, sufficient water retention of the growing medium is important to ensure that the roots have access to proper amount of water for photosynthesis, root growth, and efficient uptake of water by the growing plant without being oversaturated. Yet, the conventional mulch compositions or growing mixes usually do not achieve balanced air and water retention as typically, when the volume % of water retention rises, it is at the expense of air retention and vice versa.

The mulch composition or growing medium of the present invention advantageously can provide balanced air and water holding capacity at about 25-60 volume % each, preferably between about 43-56 volume % each, more preferably about 48-49 volume % each, based on the total volume of the mulch composition or growing medium, measured in a container having dimensions 30.5×30.5×30.5 cm (12×12×12 inches). The air and water holding capacity may each be without limitation, about 20 volume % or more, 25 volume % or more, 30 volume % or more, 35 volume % or more, 40 volume % or more, 45 volume % or more, 50 volume % or more, 55 volume % or more, 60 volume % or more, or 65 volume % or more, of the total volume of the mulch composition or growing medium, when measured in 30.5×30.5×30.5 cm (12×12×12 inches) container.

Water and air holding capacity, as referred to herein, are measured according to "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein. The water holding capacity is measured by a Container Capacity test which measures the percent volume of a substrate that is filled with water after the growing medium is saturated and allowed to drain. It is the maximum amount of water the growing medium can hold. The drainage is influenced by the height of the substrate; this property is thus dependent on container size. The taller the container, the more drainage it will cause, and the less capacity of the substrate to hold water. The oxygen holding capacity is measured as percent volume of a substrate that is filled with air after the growing medium is saturated and allowed to drain. It is the minimum amount of air the material will have. It is affected by the container height in reverse fashion to container capacity; i.e., the taller the container, the more drainage and therefore more air space.

TABLE 1

Density reduction of a peat substrate by addition of the growing medium (GM)

| Type of Substrate | Bulk Density [lb/ft$^3$]/[kg/m$^3$] peat | Bulk Density [lb/ft$^3$]/[kg/m$^3$] GM | Substrate Bulk Density [lb/ft$^3$]/ [kg/m$^3$] | Substrate Density Reduction [%] | Substrate Increase in Volume [%] | Decrease in Transportation cost [%] |
|---|---|---|---|---|---|---|
| 70 vol. % peat, 30 vol. % GM | 7.7-11.5/ 123.34-184.21 | 1.25-1.7/ 20.02-27.23 | 5.75-8.6/ 92.11-137.76 | 25.3 | 33.9 | 25.3 |
| 50 vol. % peat, 50 vol. % GM | 7.7-11.5/ 123.34-184.21 | 1.25-1.7/ 20.02-27.23 | 4.5-6.6/ 72.08-105.72 | 41.5 | 71 | 41.5 |
| 20 vol. % peat, 80 vol. % GM | 7.7-11.5/ 123.34-184.21 | 1.25-1.7/ 20.02-27.23 | 2.5-3.7/ 40.05-59.27 | 67.5 | 209 | 67.5 |
| 5 vol. % peat, 95 vol. % GM | 7.7-11.5/ 123.34-184.21 | 1.25-1.7/ 20.02-27.23 | 1.5-2.2/ 24.03-35.24 | 80.5 | 414 | 80.5 |

Balanced air (non-capillary) and water (capillary) holding capacity provides ideal growing conditions to plants. The The sum of water and air holding capacity equal total porosity for a given density and moisture content. Total porosity defines the total volume of pores and refers to percent volume of a substrate that is comprised of pores, or holes. It is the volume fraction which provides the water and aeration in a substrate. The total porosity+the percent solids=100%. Total porosity of the mulch composition or growing medium may be about 88 to about 99 volume %, about 91 to about 98 volume %, about 93 to about 97 volume %, about 94 to about 96 volume %. Total porosity of the mulch composition or growing medium may be about 88 vol. % or more, 91 vol. % or more, 93 vol. % or more, 95 vol. % or more, 97 vol. % or more, 99 vol. % or more.

The water holding capacity (WHC) of the mulch composition or growing medium may be also measured by ASTM D7367-14, a standard test method for determining water holding capacity of fiber mulches for hydraulic planting. According to ASTM D7367-14, the water holding capacity (WHC) of the mulch composition or growing medium may be about 400 to about 1000 weight %, about 500 to 1000 weight %, about 600 to 900 weight %, based on the total weight of the mulch composition or growing medium.

Alternatively still, the air holding capacity of the mulch composition or growing medium may be assessed based on a water retention curve comparison focusing on the amount of water which is available to the plant once grown in the mulch composition or growing medium. Substrates, both soil-based and soil-less, may be classified based on particle and pore size analysis as either uniform, well, or gap graded. Uniform graded substrates include particles and pores of similar diameter. An example of a uniform substrate may be sand. Well graded substrates include particles and pores of various sizes, but contain a consistent gradation of the particles from large particles to fine particles. In a well graded substrate, the pore spaces also range between large and fine. A well graded substrate is, for example, silt loam. Gap graded substrates, on the other hand, include large particles and fine particles, but lack intermediately sized particles. Thus, the pores in a gap graded substrate are either large or small, and a gap of intermediate or mid-size particles exists. An example gap graded substrate is bark.

Large particles are particles greater than 2.35 mm in diameter, mid-size particles have a diameter between 0.71 mm and 2.35 mm, and small or fine particles have a diameter smaller than 0.71 mm. The pore cavities created between particles depend on the size of the particles. The larger the particles, the larger the pores between the particles. The size distribution of particles and pores influences how water moves within a substrate. When intermediate sized pores are absent, water does not move easily between the large and small pores. Thus, a missing pore size may cause a break in hydraulic conductivity. Water may still move from the large pores to the small pores, but the transport happens via vapor phase transport instead of direct water flow. An optimal growing substrate is a well graded substrate having large, mid-size, and small particles and pores. A well graded substrate is capable of maintaining hydraulic conductivity which is beneficial to maximizing plant available water. The gradual particle distribution in a well graded substrate thus allows continuous movement of water from large to small pores.

The mulch composition or growing medium represents a well graded substrate which maintains hydraulic conductivity, provides a high percentage of available water to the plant, but unlike other well graded substrates, the growing medium also maintains high porosity. The growing medium may be used by itself or as a filler of other substrates to cure one or more of their deficiencies such as lack of intermediately sized particles. The growing medium may fill the spaces between the particles of a different substrate without clogging pore spaces. The addition of the growing medium may increase the volume of medium and small pores in a substrate, increase porosity and available water while reducing density of the substrate.

Tables 2-4 below provide comparison of particle distribution in various substrates and the growing medium (GM). Whole Tree Substrate (WTS) refers to a pine tree substrate containing pine wood, pine bark, and needles processed by hammer milling. Pine Tree Substrate (PTS) refers to a substrate containing pine wood chips processed by hammer milling.

TABLE 2

Substrate particle distribution in substrates and growing medium containing 100 vol./wt. % of one type of substrate or growing medium.

| Type of Substrate [100 vol. %] | GM Particle | Peat | Perlite | Bark |
|---|---|---|---|---|
| Sieves [Mesh/μm] | Particle Range [mm] | Particle Distribution [%] | Particle Distribution [%] | Particle Distribution [%] | Particle Distribution [%] |
| ¼"/6300 | >6.3 | 0.3 | 8.9 | 0.0 | 25.2 |
| #4/4750 | 4.75-6.2 | 0.1 | 6.1 | 2.0 | 9.6 |
| #8/2360 | 2.36-4.74 | 12.4 | 17.8 | 52.8 | 28.1 |
| #16/1180 | 1.18-2.35 | 23.8 | 18.1 | 23.9 | 16.7 |
| #25/710 | 0.71-1.17 | 24.2 | 20.1 | 8.8 | 11.0 |
| #50/300 | 0.3-0.7 | 21.5 | 20.2 | 11.8 | 9.2 |
| #100/150 | 0.15-0.29 | 10.3 | 6.9 | 0.8 | 0.2 |
| Pan/<150 | <0.15 | 7.3 | 1.9 | 0.0 | 0.0 |

In at least one embodiment, about 70 to 96 wt./vol. % of the total weight/volume of the growing medium has a particle size smaller than or equal to 4750 μm and larger than or equal to 150 μm. In another embodiment, about 70 to 96 wt./vol. % of the total weight/volume of the growing medium has a particle size smaller than or equal to 4750 μm and larger than or equal to 150 μm. Alternatively, about 64 to 96 wt./vol. % of the total weight/volume of the growing medium has a particle size smaller than or equal to 4750 μm and larger than or equal to 150 μm. In one or more embodiments, about 62.3 to 79.5 wt./vol. % of the total weight/volume of the growing medium has a particle size smaller than or equal to 4750 μm and larger than or equal to 150 μm. About 90 to 99 wt./vol. % of the total weight/volume of the growing medium has a particle size smaller than or equal to 4750 μm and larger than or equal to 150 μm. Alternatively still, about 90 to 95 wt./vol. % of the total weight/volume of the growing medium has a particle size smaller than or equal to 4750 μm and larger than or equal to 150 μm.

In one or more embodiments, about 70 to 96 wt./vol. % of the total weight/volume of the growing medium has a particle size smaller than or equal to 2360 μm and larger than or equal to 150 μm. In another embodiment, about 70 to 96 wt./vol. % of the total weight/volume of the growing medium has a particle size smaller than or equal to 2360 μm and larger than or equal to 150 μm. Alternatively, about 64 to 96 wt./vol. % of the total weight/volume of the growing medium has a particle size smaller than or equal to 2360 μm and larger than or equal to 150 μm. In one or more embodiments, about 62.3 to 79.5 wt./vol. % of the total weight/volume of the growing medium has a particle size smaller than or equal to 2360 μm and larger than or equal to 150 μm. About 77 to 96 wt./vol. % of the total weight/volume of the growing medium has a particle size smaller than or equal to 2360 μm and larger than or equal to 150 μm. Alternatively, about 80 to 90 wt./vol. % of the total weight/volume of the growing medium has a particle size smaller than or equal to 2360 μm and larger than or equal to 150 μm. About 56 to 86 wt./vol. % of the total weight/volume of the growing medium has a particle size smaller than or equal to 2360 μm and larger than or equal to 150 μm.

In one or more embodiments, about 40 to 80 wt./vol. % of the total weight/volume of the growing medium has a particle size greater than or equal to 710 μm and less than or equal to 1180 μm. Alternatively, about 36 to 86 wt./vol. % of the total weight/volume of the growing medium has a particle size greater than or equal to 710 μm and less than or equal to 1180 μm. In one or more embodiments, about 39 to 70 wt./vol. % of the total weight/volume of the growing medium has a particle size greater than or equal to 710 μm and less than or equal to 1180 μm. About 40 to 55 wt./vol. % of the total weight/volume of the growing medium has a particle size greater than or equal to 710 μm and less than or equal to 1180 μm. Alternatively still, about 45 to 50 wt./vol. % of the total weight/volume of the growing medium has a particle size greater than or equal to 710 μm and less than or equal to 1180 μm.

In one or more embodiments, about 10.1 to 25.0 wt./vol. % of the total weight/volume of the growing medium has a particle size greater than or equal to 2360 μm and less than or equal to 4750 μm. Alternatively, about 4.0 to 31.0 wt./vol. % of the total weight/volume of the growing medium has a particle size greater than or equal to 2360 μm and less than or equal to 4750 μm. In one or more embodiments, about 12.5 to 20.5 wt./vol. % of the total weight/volume of the growing medium has a particle size greater than or equal to 2360 μm and less than or equal to 4750 μm. About 10.0 to 23.5 wt./vol. % of the total weight/volume of the growing medium has a particle size greater than or equal to 2360 μm and less than or equal to 4750 μm. Alternatively still, about 12.0 to 23.0 wt./vol. % of the total weight/volume of the growing medium has a particle size greater than or equal to 2360 μm and less than or equal to 4750 μm.

TABLE 3

Substrate particle distribution in substrates containing 100 vol. % of one type of substrate.

| Type of Substrate [100 vol. %] | | Coir | | |
| --- | --- | --- | --- | --- |
| Sieves [Mesh/ μm] | Particle Range [mm] | Particle Distribution [%] | WTS Particle Distribution [%] | PTS Particle Distribution [%] |
| ¼"/ 6300 | >6.3 | 0.0 | 0.0 | 35.8 |
| #4/ 4750 | 4.75-6.2 | 0.2 | 0.2 | 17.1 |
| #8/ 2360 | 2.36-4.74 | 6.6 | 14.0 | 27.8 |
| #16/ 1180 | 1.18-2.35 | 24.6 | 42.0 | 12.3 |
| #25/ 710 | 0.71-1.17 | 26.2 | 24.2 | 5.2 |
| #50/ 300 | 0.3-0.7 | 40.0 | 14.9 | 1.7 |
| #100/ 150 | 0.15-0.29 | 1.9 | 4.1 | 0.1 |
| Pan/ <150 | <0.15 | 0.5 | 0.7 | 0.0 |

TABLE 4

Substrate particle distribution in substrates to which either growing medium, perlite, WTS, or PTS was added.

| Type of Substrate | | 50 vol. % Peat, 50 vol. % GM | 70 vol. % Peat, 30 vol. % GM | 80 vol. % Bark, 20 vol. % GM | 80 vol. % Peat, 20 vol. % Perlite | 70 vol. % Peat, 30 vol. % WTS | 70 vol. % Peat, 30 vol. % PTS |
| --- | --- | --- | --- | --- | --- | --- | --- |
| Sieves [Mesh/ μm] | Particle Range [mm] | Particle Distribution [%] | Particle Distribution [%] | Particle Distribution [%] | Particle Distribution [%] | Particle Distribution [%] | Particle Distribution [%] |
| ¼"/ 6300 | >6.3 | 0.6 | 1.1 | 8.4 | 1.75 | 0.5 | 21.0 |
| #4/ 4750 | 4.75-6.2 | 2.4 | 1.7 | 7.7 | 2.1 | 1.0 | 10.1 |
| #8/ 2360 | 2.36-4.74 | 6.6 | 9.6 | 24.8 | 15.0 | 10.0 | 16.3 |
| #16/ 1180 | 1.18-2.35 | 14.4 | 12.2 | 20.8 | 12.3 | 18.9 | 10.6 |
| #25/ 710 | 0.71-1.17 | 27.9 | 17.2 | 13.3 | 15.2 | 16.9 | 10.4 |
| #50/ 300 | 0.3-0.7 | 30.5 | 30.6 | 17.5 | 35.3 | 28.9 | 18.8 |
| #100/ 150 | 0.15-0.29 | 11.2 | 20.2 | 6.9 | 14.9 | 18.2 | 8.9 |
| Pan/ <150 | <0.15 | 6.6 | 7.4 | 0.5 | 3.5 | 5.5 | 4.0 |

The available water of various substrates and the growing medium was assessed using a Hyprop. Hyprop is a modular lab instrument capable of generating a moisture characteristic curve of a sample material and determines the unsaturated hydraulic conductivity of a sample material. Hyprop measures loss of conductivity of water in a substrate. According to Pertassek, T., A. Peters and W. Durner (2015), "[t]his method uses weight changes of samples and the matric potential measurements in the samples during a drying process caused by evaporation to derive soil hydraulic functions." As each sample dries, water within the sample continually moves from the larger to smaller pores until the water can no longer move easily due to a gap in the grading of the substrate. At that point, Hyprop begins to measure the unsaturated hydraulic conductivity.

During the testing, 250 cm$^3$ cores/sampling rings were packed to a known density with substrates 1-5 and allowed to sub-irrigate. The Hyprop unit and two tensiometers, at two different lengths, were filled with degassed water and inserted into the packed cores. Each core+Hyprop was placed on a scale, and available water was monitored as each sample dried. During the monitoring, a computer equipped with software collected several thousand measurements for each sample. Based on the collected data points, the software generated a water release curve and the point of unsaturated hydraulic conductivity (UHC) for each sample. UHC indicates a point at which a plant starts to experience water stress.

Figure 9:
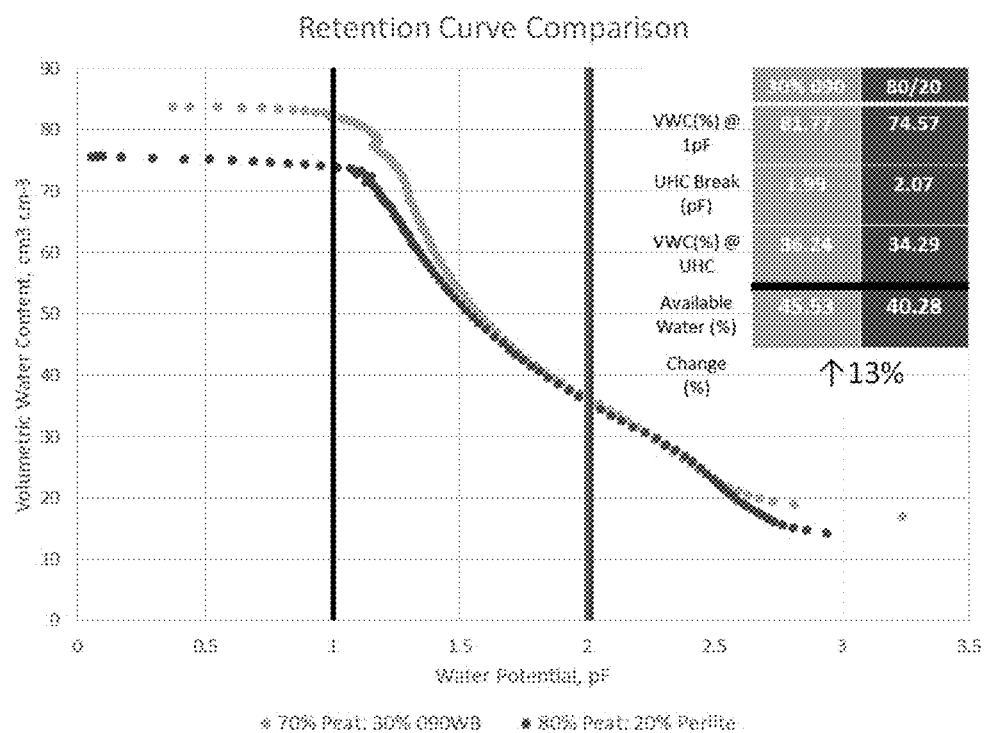
FIGS. 9 and 10 show retention curve comparisons of various substrates.
Figure 10:
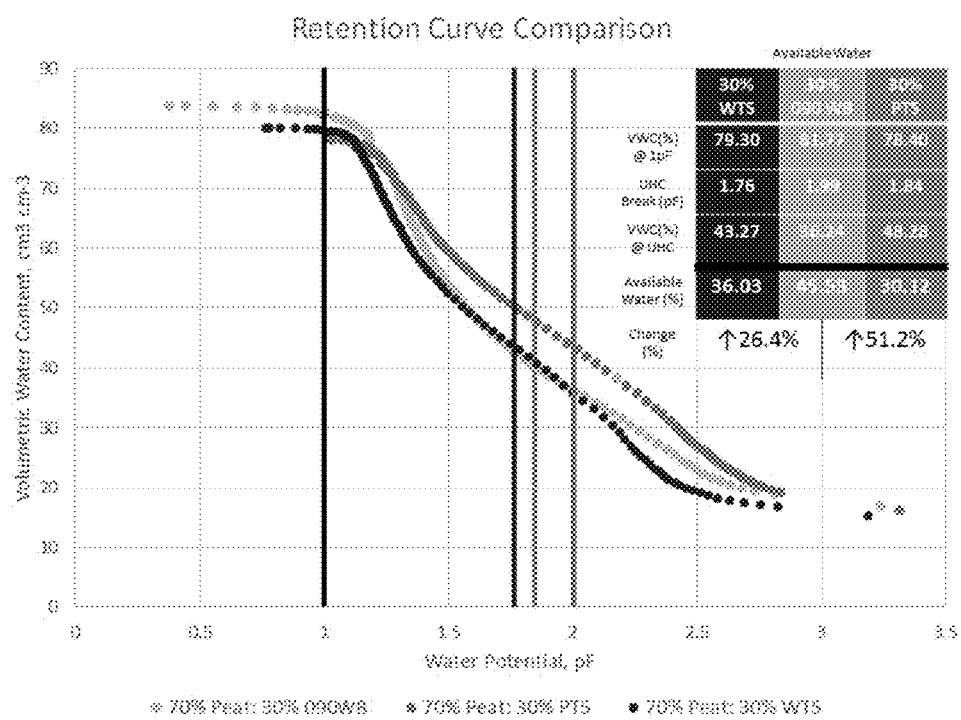

Table 5 below, as well as FIG. 9 (sample nos. 1-3) and 10 (sample nos. 4 and 5), show the results of the Hyprop measurements for different substrates. Volumetric Water Content (VWC) at 1 pF is a commonly accepted threshold for container capacity or water holding capacity in a substrate. The UHC break relates to a specific volumetric water content at which hydraulic conductivity breaks in each substrate. The UHC break thus indicates, for each substrate, when the substrate begins to perform sub-optimally with regard to providing available water to the plant. The available water is the difference between VWC at 1 pF and VWC at UHC break.

TABLE 5

Hyprop test results

| Sample no. | Type of Substrate | Volumetric Water Content at 1 pF [%] | UHC Break (pF) | Volumetric Water Content at UHC Break [%] | Available Water [%] |
|---|---|---|---|---|---|
| 1 | 70 vol. % peat, 30 vol. % GM | 81.77 | 1.99 | 36.24 | 45.53 |
| 2 | 70 vol. % peat, 30 vol. % PTS | 78.40 | 1.84 | 48.28 | 30.12 |
| 3 | 70 vol. % peat, 30 vol. % WTS | 79.30 | 1.76 | 43.27 | 36.03 |
| 4 | 80 vol. % peat, 20 vol. % perlite | 71.51 | 1.91 | 32.99 | 38.52 |
| 5 | 80 vol. % peat, 20 vol. % perlite | 74.57 | 2.07 | 34.29 | 40.28 |

Additional testing was performed with four different samples, each of which contained 80 vol. % of peat and the remained formed by an addition of perlite, vermiculite, coir, or growing medium (GM), respectively. The testing incorporated yet another methodology of assessing data regarding available water, specifically pressure plate testing. For each sample, a six-inch cylinder was filled with the material and allowed to saturate in a water bath for 24 hours. The cylinder was removed from the water bath without allowing it to drain and was weighed to calculate saturated bulk density. The cylinder was allowed to drain freely for 2 hours and was weighed again. Each sample was then placed in an oven for 24 hours to dry and then re-weighed. The measured values, along with the known volume of the cylinder, water retention, air space, and solids were calculated as volume percentages in the container. To determine available water at different pressures, a smaller cylinder was used (pressure cores) for each sample in a similar fashion except the cylinder was placed under 2 centibars (2,000 Pa) of pressure in a pressure pot for 24 hours and then weighed. The measured value, along with the porosity determined in the six-inch cylinder, was used to determine available water at the specific pressure. The measurement was repeated at 24 hour intervals for the 10 centibar (10,000 Pa) and 50 centibar (50,000 Pa) values. Readily available water is the volumetric water content between 2 centibars (2,000 Pa) and 50 centibars (50,000 Pa). Potentially available water relates to the amount of available water after adding back 50% of the water that was held in the substrate at 50 centibars (50,000 Pa) of pressure. Available water improvement expresses how much more available water there is when peat is amended with GM versus perlite, vermiculite, and coco pith at 20% inclusion rates.

TABLE 6

Test data for a substrate containing 80 vol. % peat and 20 vol. % substitute measured by pressure plate testing

| Type of Substrate | Total Porosity [%] | Container Water Capacity [%] | Air Space [%] | Available Water [%] | Potentially Available Water [%] | Available Water Improvement [%] |
|---|---|---|---|---|---|---|
| 80 vol. % peat, 20 vol. % perlite | 85.2 | 65.5 | 19.7 | 32.9 | 49.2 | 10 |
| 80 vol. % peat, 20 vol. % vermiculite | 85.1 | 67.1 | 17.9 | 30.3 | 48.7 | 19.5 |

TABLE 6-continued

Test data for a substrate containing 80 vol. % peat and 20 vol. % substitute measured by pressure plate testing

| Type of Substrate | Total Porosity [%] | Container Water Capacity [%] | Air Space [%] | Available Water [%] | Potentially Available Water [%] | Available Water Improvement [%] |
|---|---|---|---|---|---|---|
| 80 vol. % peat, 20 vol. % coco pith | 86.3 | 68.6 | 17.7 | 26.5 | 47.6 | 36.6 |
| 80 vol. % peat, 20 vol. % GM | 89.3 | 67.6 | 21.6 | 36.2 | 51.9 | — |

Compared to other substrates, the growing medium processed in the pressurized vessel by a process described above has fiber which is thinner and longer, which has higher surface area ratio, much lower density, as well as smaller median particle diameter, as is shown in Table 7 below. The surface area ratio refers to the following formula: 10/median particle diameter/dry bulk density. The smaller the median particle diameter at the lower density equates to higher surface area of the particles. Due to the growing medium preparation process described herein, the lignin with the growing medium components melts and the resultant fiber is shaped differently compared to other media. For example, coir particles are generally spherical in shape with a smaller aspect ratio than the growing medium fiber. Bark particles and perlite are generally cylindrical. Peat, PTS, and WTS particles are more elongated than coir, bark, and perlite, but remain wider and shorter than growing medium fiber. Example particles and fibers are shown in FIGS. 1A-8B.

TABLE 7

Median particle diameter, dry bulk density, and surface area ratio of various substrates and of the growing medium. The dry bulk density was assessed using a container of the following dimensions: 30.5 × 30.5 × 30.5 cm (12 × 12 × 12 inches).

| | Type of Substrate [100 vol. %] | | | | | | |
|---|---|---|---|---|---|---|---|
| | GM | Peat | Perlite | Bark | Coir | PTS | WTS |
| Median Particle Diameter [mm] | 0.92 | 1.24 | 2.57 | 3.45 | 0.84 | 5.00 | 1.35 |
| Dry Bulk Density [kg/l] | 0.02 | 0.08 | 0.06 | 0.19 | 0.09 | 0.13 | 0.14 |
| Surface Area Ratio | 549.1 | 106.4 | 65.4 | 15.4 | 127.4 | 15.3 | 54.2 |

Additionally, the fiber's average length to width ratio is significantly greater in the growing medium than in other substrates, as is evidenced in Table 8 below. Since water is held by surface tension along the length of the fiber, the longer the fiber is, the more water can be held by the substrate. Since the growing medium has fiber with greater length to width ratio than other substrates, the growing medium has higher available water and allows for development of a plant root ball in a faster manner. Additionally, the elongated fiber of the growing medium provides reinforcement of the substrate in a planting container. Since a container plant can be sold once it can be successfully removed from the container and a substrate does not fall away from the roots, using the growing medium as a substrate or as a filler to a different substrate increases plant establishment and thus results in a faster crop turn.

TABLE 8

Average length to width ratio of particles in sieves #16 and #50 of various substrates and of the growing medium.

| | Sieve #16/1180 μm 1.18-2.36 mm Particle Range Average length to Width Ratio Range | | Sieve #50/300 μm 0.30-0.71 mm Particle Range Average length to Width Ratio Range | |
|---|---|---|---|---|
| Type of Substrate [100 vol. %] | Lower | Higher | Lower | Higher |
| GM | 14.899:1 | 30.602:1 | 39.615:1 | 55.507:1 |
| Peat | 1.463:1 | 2.010:1 | 3.498:1 | 6.323:1 |
| Perlite | 1.070:1 | 1.133:1 | 1:1 | 1.260:1 |
| Bark | 1.255:1 | 1.520:1 | 1.702:1 | 2.019:1 |
| Coir | 1.720:1 | 1.840:1 | 1.051:1 | 1.349:1 |
| PTS | 7.260:1 | 7.392:1 | 2.543:1 | 14.497:1 |
| WTS | 1.805:1 | 4.368:1 | 4.942:1 | 13.329:1 |

In at least about one embodiment, about 10 to 80 weight % of the growing medium has fiber with an average length to width ratio, also referred to as an aspect ratio, of 14:1 to 31:1. In an alternative embodiment, at least about 20 to 70 weight % of the growing medium has fiber with an average length to width ratio of 14:1 to 31:1. In a yet another embodiment, about 30 to 60 weight % of the growing medium has fiber with an average length to width ratio of 14:1 to 31:1. Alternatively, at least about 40 to 50 weight % of the growing medium has fiber with an average length to width ratio of 14:1 to 31:1. Alternatively still, about 15 to 40 weight % of the growing medium has fiber with an average length to width ratio of 14:1 to 31:1. In another embodiment, about 18 to 30 weight % of the growing medium has fiber with an average length to width ratio of 14:1 to 31:1.

In at least one embodiment, about 10 to 80 weight % of the growing medium has fiber with an average length to width ratio of 39:1 to 56:1. In an alternative embodiment, about 20 to 70 weight % of the growing medium has fiber with an average length to width ratio of 39:1 to 56:1. In a yet another embodiment, about 30 to 60 weight % of the growing medium has fiber with an average length to width ratio of 39:1 to 56:1. Alternatively, about 40 to 50 weight % of the growing medium has fiber with an average length to width ratio of 39:1 to 56:1. Alternatively still, about 15 to 40 weight % of the growing medium has fiber with an average length to width ratio of 39:1 to 56:1. In another embodiment, about 18 to 30 weight % of the growing medium has fiber with an average length to width ratio of 39:1 to 56:1.

At least about 1, 2, 5, 10, 15, 20, 25, 30, 35, 40, 45, 50, 55, 60, 65, 70, 75, 80, 85, 90 weight % of the growing medium fibers have an average length to width aspect ratio equal to or greater than 8:1, 9:1, 10:1, 14:1, 15:1, 18:1, 20:1, 22:1, 25:1, 18:1, 30:1 in sieve #16. About 10 to 80, 20 to 70, 30, to 60, 40 to 50 weight % of the growing medium fiber has the aspect ratio of equal to or greater than 8:1, 9:1, 10:1, 14:1, 15:1, 18:1, 20:1, 22:1, 25:1, 18:1, 30:1 in sieve #16.

At least about 1, 2, 5, 10, 15, 20, 25, 30, 35, 40, 45, 50, 55, 60, 65, 70, 75, 80, 85, 90 weight % of the growing medium fibers have an average length to width aspect ratio equal to or greater than 16:1, 18:1, 20:1, 22:1, 24:1, 26:1, 28:1, 30:1, 32:1, 33:1, 34:1, 36:1, 38:1, 39:1, 40:1, 42:1, 44:1, 46:1, 48:1, 50:1, 52:1, 55:1 in sieve #50. About 10 to 80, 20 to 70, 30 to 60, 40 to 50 weight % of the growing medium fiber has the aspect ratio of equal to or greater than 16:1, 18:1, 20:1, 22:1, 24:1, 26:1, 28:1, 30:1, 32:1, 33:1, 34:1, 36:1, 38:1, 39:1, 40:1, 42:1, 44:1, 46:1, 48:1, 50:1, 52:1, 55:1 in sieve #50.

At least about 1, 2, 5, 10, 15, 20, 25, 30, 35, 40, 45, 50, 55, 60, 65, 70, 75, 80, 85, 90 volume % of the growing medium fibers have an average length to width aspect ratio equal to or greater than 8:1, 9:1, 10:1, 15:1, 18:1, 20:1, 22:1, 25:1, 18:1, 30:1 in sieve #16. About 10 to 80, 20 to 70, 30 to 60, 40 to 50 volume % of the growing medium fiber has the aspect ratio of equal to or greater than 8:1, 9:1, 10:1, 15:1, 18:1, 20:1, 22:1, 25:1, 18:1, 30:1 in sieve #16.

At least about 1, 2, 5, 10, 15, 20, 25, 30, 35, 40, 45, 50, 55, 60, 65, 70, 75, 80, 85, 90 volume % of the growing medium fibers have an average length to width aspect ratio equal to or greater than 16:1, 18:1, 20:1, 22:1, 24:1, 26:1, 28:1, 30:1, 32:1, 33:1, 34:1, 36:1, 38:1, 39:1, 40:1, 42:1, 44:1, 46:1, 48:1, 50:1, 52:1, 55:1 in sieve #50. About 10 to 80, 20 to 70, 30 to 60, 40 to 50 volume % of the growing medium fiber has the aspect ratio of equal to or greater than 16:1, 18:1, 20:1, 22:1, 24:1, 26:1, 28:1, 30:1, 32:1, 33:1, 34:1, 36:1, 38:1, 39:1, 40:1, 42:1, 44:1, 46:1, 48:1, 50:1, 52:1, 55:1 in sieve #50.

At least about 1, 2, 3, 4, 5, 6, 7, 8, 9, 10, 15, 20, 25, 30, 35, 40, 45, 50, 55, 60, 65, 70, 75, 80, 85, 90, 95 weight % of the fibers, based on the total weight of the fibers, have an average length to width ratio of about 8:1 to 35:1, 10:1 to 30:1, 12:1 to 28:1, 15:1 to 25:1, 18:1 to 23:1, 20:1 to 22:1 in sieve #16, and/or 15:1 to 60:1, 20:1 to 55:1, 25:1 to 50:1, 28:1 to 45:1, 25:1:40:1, 28:1 to 38:1, 30:1 to 35:1 in sieve #50. Alternatively, at least about 1 to 90, 10 to 80, 20 to 70, 30 to 60, 40 to 50 weight % of the fibers, based on the total weight of the fibers, have an average length to width ratio of at about 8:1 to 35:1, 10:1 to 30:1, 12:1 to 28:1, 15:1 to 25:1, 18:1 to 23:1, 20:1 to 22:1 in sieve #16, and/or 15:1 to 60:1, 20:1 to 55:1, 25:1 to 50:1, 28:1 to 45:1, 25:1:40:1, 28:1 to 38:1, 30:1 to 35:1 in sieve #50.

At least 1, 2, 3, 4, 5, 6, 7, 8, 9, 10, 15, 20, 25, 30, 35, 40, 45, 50, 55, 60, 65, 70, 75, 80, 85, 90, 95 volume % of the fibers, based on the total volume of the fibers, have an average length to volume ratio of about 8:1 to 35:1, 10:1 to 30:1, 12:1 to 28:1, 15:1 to 25:1, 18:1 to 23:1, 20:1 to 22:1, 9:1 to 50:1, 13.5:1 to 34:1, 14:1 to 32:1 in sieve #16, and/or 15:1 to 60:1, 20:1 to 55:1, 25:1 to 50:1, 28:1 to 45:1, 25:1:40:1, 28:1 to 38:1, 30:1 to 35:1, 30:1 to 70:1, 37:1 to 62:1, 38:1 to 60:1 in sieve #50. Alternatively, about 1 to 90, 10 to 80, 20 to 70, 30 to 60, 40 to 50 volume % of the fibers, based on the total volume of the fibers, have an average length to width ratio of about 8:1 to 35:1, 10:1 to 30:1, 12:1 to 28:1, 15:1 to 25:1, 18:1 to 23:1, 20:1 to 22:1 in sieve #16, and/or 15:1 to 60:1, 20:1 to 55:1, 25:1 to 50:1, 28:1 to 45:1, 25:1:40:1, 28:1 to 38:1, 30:1 to 35:1 in sieve #50.

An additional advantage of the mulch composition or growing medium of the present invention is lower dry bulk density as well as wet bulk density when compared to prior art substrates. High density may impose transportation limits on the mulch compositions or growing substrates as such substrates may reach their weight limit before they reach the volume limit feasible for transportation. When compared to higher density media, the lower wet and dry bulk densities of the present mulch composition or growing medium provide greater volume of the mulch composition or growing medium to the end user at the same weight. The low density mulch composition or growing medium of the present invention may be added as a component to prior art mulches or growing media and thus lower their transportation costs by about 5% or more, 10% or more, 15% or more, or 20% or more, as compared to the prior art media alone. Additionally, a consumer may find it easier to purchase and utilize the growing medium of the present invention because of its lower weight. The dry bulk density of the growing medium may be, in order of increasing preference, about 6 lb/ft$^3$ (96.11 kg/m$^3$) or less, 4 lb/ft$^3$ (64.07 kg/m$^3$) or less, 3 lb/ft$^3$ (48.06 kg/m$^3$) or less, or 2 lb/ft$^3$ (32.04 kg/m$^3$) or less. The dry bulk density of the mulch composition or growing medium may be about 1.5 lb/ft$^3$ (24.03 kg/m$^3$) to about 6 lb/ft$^3$ (96.11 kg/m$^3$), about 2 lb/ft$^3$ (32.04 kg/m$^3$) to about 4 lb/ft$^3$ (64.07 kg/m$^3$), about 2.2 lb/ft$^3$ (35.24 kg/m$^3$) to about 2.6 lb/ft$^3$ (41.65 kg/m$^3$). The wet bulk density of the mulch composition or growing medium may be, in order of increasing preference, about 15 lb/ft$^3$ (240.28 kg/m$^3$) or less, 10 lb/ft$^3$ (160.18 kg/m$^3$) or less, 8 lb/ft$^3$ (128.15 kg/m$^3$) or less, 6 lb/ft$^3$ (96.11 kg/m$^3$) or less, 4 lb/ft$^3$ (64.07 kg/m$^3$) or less, 3 lb/ft$^3$ (48.06 kg/m$^3$) or less, or 2 lb/ft$^3$ (32.04 kg/m$^3$) or less. The wet bulk density of the mulch composition or growing medium may be about 1 lb/ft$^3$ (16.02 kg/m$^3$) to about 20 lb/ft$^3$ (320.37 kg/m$^3$), about 2.2 lb/ft$^3$ (35.24 kg/m$^3$) to about 10 lb/ft$^3$ (160.18 kg/m$^3$), about 2.4 lb/ft$^3$ (38.44 kg/m$^3$) to about 15 lb/ft$^3$ (240.28 kg/m$^3$), about 2.6 (41.65 kg/m$^3$) to 10 lb/ft$^3$ (160.18 kg/m$^3$), about 2.8 lb/ft$^3$ (44.85 kg/m$^3$) to about 7 lb/ft$^3$ (112.13 kg/m$^3$), about 3.0 lb/ft$^3$ (48.06 kg/m$^3$) to about 5 lb/ft$^3$ (80.09 kg/m$^3$).

Table 9 below illustrates test results for one embodiment of a mulch composition or growing medium comprising about 80% wood components and about 20% tree bark and another embodiment comprising 100% pine wood fiber, based on the total weight of the mulch composition or growing medium, in comparison to prior art growing media.

TABLE 9

| Mulch/growing medium | Mulch/growing media properties | | | | | | |
|---|---|---|---|---|---|---|---|
| | Volume of air space [vol. %] | Volume of air space - range [vol. %] | Dry bulk density | | Wet bulk density | | Moisture content [%] |
| | | | [lb/ft$^3$] | [kg/m$^3$] | [lb/ft$^3$] | [kg/m$^3$] | |
| Mulch/growing medium of present invention (80% wood, 20% bark) | 30.25 | 25-75 | 2.37 | 37.96 | 2.83 | 45.33 | 90.99 |

TABLE 9-continued

Mulch/growing media properties

| Mulch/growing medium | Volume of air space [vol. %] | Volume of air space - range [vol. %] | Dry bulk density [lb/ft³] | Dry bulk density [kg/m³] | Wet bulk density [lb/ft³] | Wet bulk density [kg/m³] | Moisture content [%] |
|---|---|---|---|---|---|---|---|
| Mulch/growing medium of present invention (100% pine wood fiber) | 44.53 | 25-75 | 2.20 | 35.24 | 2.49 | 39.89 | 89.80 |
| Sphagnum Peat | 10.22 | 5-25 | 4.25 | 68.08 | 12.04 | 192.86 | 85.78 |
| ⅜" Hammermilled Bark | 24.00 | 20-45 | 9.64 | 154.42 | 23.82 | 381.56 | 75.99 |
| Retruder Processed Bark | 14.69 | — | 7.46 | 119.50 | 19.85 | 317.49 | 84.56 |
| Coir Block Fiber | 15.36 | — | 4.42 | 70.80 | 32.55 | 521.40 | 89.33 |

The data in Table 9 was collected by JR Peters Laboratory Allentown, Pa., USA, using "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein.

The percent volume of air space in Table 9 refers to the air holding capacity discussed above which was measured as the percent volume of a substrate that is filled with air after the material is saturated and allowed to drain. It is the minimum amount of air the material will have. The analysis using the NCSU Porometer was performed on a 28.3 inch³ (463.8 cm³) sample in a 3×3 inches (7.6×7.6 cm) aluminum cylinder.

The bulk density in Table 9 refers to the ratio of the mass of dry solids to the bulk volume of the substrate. The bulk volume includes the volume of solids and pore space. The mass is determined after drying a packed core to constant weight at 221° F. (105° C.), and volume is that of the sample in cylinders.

The moisture content in Table 9 refers to the percent moisture found in a sample on a wet mass basis. This is calculated by: [(Wet weight−Dry weight)/Wet weight]×100. It denotes how much of a particular sample is comprised of water.

Table 10 provides comparison of prior art growing media with two embodiments of the present invention, specifically one embodiment of a mulch composition or growing medium comprising about 80% wood components and about 20% tree bark and another embodiment comprising 100% pine wood fiber, based on the total weight of the mulch composition or growing medium. The loose bulk density data in Table 7 was gained by packing the mulch composition or growing medium into a container measuring 30.5× 30.5×30.5 cm (12×12×12 inches) after the mulch composition or growing medium was expanded by an opener and/or by using a process recommended for the specific kind of a mulch composition or growing medium.

TABLE 10

Loose bulk density

| Mulch/growing medium | Expanded bulk density including moisture content of the mulch/growing medium [lb/ft³] | Expanded bulk density including moisture content of the mulch/growing medium [kg/m³] | Net dry weight expanded bulk density [lb/ft³] | Net dry weight expanded bulk density [kg/m³] |
|---|---|---|---|---|
| Mulch/growing medium of present invention (80% wood, 20% bark) | 1.2-1.75 | 19.22-28.03 | 0.9-1.35 | 14.42-21.62 |
| Mulch/growing medium of present invention (100% pine wood fiber) | 1.0-1.65 | 16.02-26.43 | 0.75-1.25 | 12.01-20.02 |
| Sphagnum Peat | 9.0-12.5 | 144.17-200.23 | 5.0-6.85 | 80.09-109.73 |
| ⅜" Hammermilled Composted Pine Bark | 23-33 | 368.43-528.61 | 11.0-17.5 | 176.20-280.32 |
| ⅜" Hammermilled Aged Pine Bark | 15-20 | 240.28-320.37 | 7.5-10 | 120.14-160.19 |

Table 11 provides a size classification of the fiber of the mulches or growing media; the weight % of material passing through various sieve sizes as well as density, WHC, and total porosity are also provided. Total porosity was measured by the porometer testing "Procedures for Determining Physical Properties of Horticultural Substrates Using the NCSU Porometer by Horticultural Substrates Laboratory," as referenced above.

TABLE 11

Wood fiber size classification

| | | Materials: wt. % wood components/wt. % bark | | | | | Particle size ranges |
|---|---|---|---|---|---|---|---|
| | | 90%/10% | 70%/30% | 50%/50% | 30%/70% | 10%/90% | |
| Sieves Mesh/µm | #8/2360 [wt. %] | 15.9 | 26.7 | 21.0 | 8.6 | 4.7 | 4-25 |
| | #16/1180 [wt. %] | 23.8 | 16.3 | 9.6 | 10.1 | 8.9 | 9-30 |
| | #25/710 [wt. %] | 25.0 | 14.9 | 12.5 | 13.7 | 10.1 | 15-35 |
| | #50/300 [wt. %] | 20.7 | 17.6 | 25.6 | 27.0 | 25.4 | 15-30 |
| | #100/150 [wt. %] | 10.0 | 13.5 | 15.4 | 21.1 | 20.4 | 6-15 |
| | pan/<150 [wt. %] | 4.6 | 11.0 | 15.9 | 19.5 | 26.4 | 2-20 |
| Total porosity | Porometer [vol. %] | 96-99 | 94-98 | 93-97 | 91-95 | 88-94 | 88-99 |
| Density | Range [lb/ft³]; [kg/m³] | 1.5-2.0; 24-32 | 1.5-2.5; 24-40 | 2.0-3.25; 32-52 | 3.0-5.0; 48-80 | 3.5-6.5; 56-104 | 1.5-6.5; 24-104 |
| WHC | ASTM D7367-14 [wt. %] | 825-925 | 725-825 | 625-725 | 500-625 | 400-500 | — |

The sieve size of the fiber particles in the end product may range from US sieve size #8 to #100, but other sieve sizes are contemplated. The size of the fiber in the mulch composition or growing medium may range from about 0.149 mm to about 2.36 mm. Some of the wood components and/or bark may be processed in such a way that they become a powder with a particle size of about 30 µm or smaller to about 600 µm or larger. Generally, the smaller the fiber size, the higher the WHC.

In the Table 11 above, 79.5% of the wood/bark fiber components of the composition having 90 wt. % wood components and 10 wt. % bark, has a particle size smaller than 2360 µm and larger than 150 µm. 62.3% of the wood/bark fiber components of the composition having 70 wt. % wood components and 30 wt. % bark has a particle size smaller than 2360 µm and larger than 150 µm. 63.1% of the wood/bark fiber components of the composition having 50 wt. % wood components and 50 wt. % bark has a particle size smaller than 2360 µm and larger than 150 µm. 71.9% of the wood/bark fiber components of the composition having 30 wt. % wood components and 70 wt. % bark has a particle size smaller than 2360 µm and larger than 150 µm. 64.8% of the wood/bark fiber components of the composition having 10 wt. % wood components and 90 wt. % bark has a particle size smaller than 2360 µm and larger than 150 µm.

In an alternative embodiment, 70 to 90 wt. % of the fibrous wood components have a particle size smaller than 2360 µm and larger than 150 µm. In at least one embodiment, 55 to 90 wt. % of the fibrous wood components have a particle size smaller than 2360 µm and larger than 150 µm. In another embodiment, 63.1 to 79.5 wt. % % of the fibrous wood components of the composition have a particle size smaller than 2360 µm and larger than 150 µm.

About 10.1 to 25.0 wt. % of the fibrous wood components have a particle size greater than 710 µm and less than 1180 µm. In an alternative embodiment, about 12 to 20 wt. % of the fibrous wood components have a particle size greater than 710 µm and less than 1180 µm. Alternatively still, about 15 to 18 wt. % of the fibrous wood components have a particle size greater than 710 µm and less than 1180 µm.

At least about 10 to 90, 20 to 80, 30 to 70, 40 to 60 weight % of fibers having a particle size from 150 µm to 2360 µm have an average aspect ratio of at least 9:1 to 55:1, 9.5:1 to 50:1, 10:1 to 45:1, 11:1 to 40:1, 12:1 to 38:1, 13:1 to 35:1, 13.5:1 to 34:1, 14:1 to 33.5:1, or 14.5:1 to 33:1.

The mulch composition or growing medium may be also used in hydraulic applications. The hydraulically-applied mulch composition or growing medium presents an effective solution for restoration of vegetation and erosion control. The hydraulically-applied mulch composition or growing medium may bond directly to soil while protecting seed, thus sheltering seedlings and/or plants from wind, heavy rain, and other environmental conditions while allowing seed germination and plant growth. The hydraulically-applied mulch composition or growing medium may be used to secure statically-compromised slopes, stabilize highly erodible soil, reintroduce native species of plants, the like, or a combination thereof. The hydraulically-applied mulch composition or growing medium may be used alone or in combination with other erosion-control methods. The hydraulically-applied mulch composition or growing medium may be used during highway projects, recreational projects such as golf courses, in mine reclamation areas, in industrial or other applications.

The hydraulically-applied mulch composition or growing medium may be applied to a site at once or in a plurality of stages. The mulch composition or growing medium may be mixed together with water, and optionally seed, chemical binders, natural gums, and/or interlocking manmade fibers, and/or other components in a tank of a hydro-spraying machine or another suitable equipment. The seed may contain one species or comprise a mix of species such as native or non-native grasses, wildflowers, forbs, or other desirable species. The mixing may continue until all fiber of the mulch composition or growing medium is substantially broken apart and hydrated. When proper viscosity and activation of bonding additives is achieved, additional components named above or other components such as fertilizers, macronutrients, and/or micronutrients, may be added. The hydrated mulch composition or growing medium may be then applied onto the site from a suitable equipment such as a hydro-spraying machine with a fan-type nozzle. Immediately after application, the mulch composition or growing medium bonds directly to the soil and provides protection for dormant seed, minimizes soil loss, and assists in fast establishment of vegetation at the application site.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A growing medium comprising:
    about 5 to about 95 weight % fibrous tree bark, based on the total weight of the growing medium; and
    about 5 to about 95 weight % fibrous wood components, based on the total weight of the growing medium,
    wherein about 10 to about 80 weight % of the growing medium, based on the total weight of the growing medium, comprises fibers having an average length to width ratio of about 14:1 to 31:1 and about 10 to 80 weight % of the growing medium, based on the total weight of the growing medium, comprises fibers having an average length to width ratio of about 39:1 to 56:1 such that the growing medium has a dry bulk density of about 60 kg/m$^3$ or lower and wet bulk density of about 120 kg/m$^3$ or lower.

2. The growing medium of claim 1, wherein about 15 to about 40 weight % of the growing medium, based on the total weight of the growing medium, comprises fibers having an average length to width ratio of about 14:1 to 31:1 and about 15 to 40 weight % of the growing medium, based on the total weight of the growing medium, comprises fibers having an average length to width ratio of about 39:1 to 56:1.

3. The growing medium of claim 1, wherein about 18 to about 30 weight % of the growing medium, based on the total weight of the growing medium, comprises fibers having an average length to width ratio of about 14:1 to 31:1 and about 18 to 30 weight % of the growing medium, based on the total weight of the growing medium, comprises fibers having an average length to width ratio of about 39:1 to 56:1.

4. The growing medium of claim 1, wherein about 70 to 96 weight % of the total weight of the growing medium comprises fibers having a particle size equal to or smaller than about 4750 μm and equal to or larger than 150 μm.

5. The growing medium of claim 1, wherein the growing medium has a total porosity of about 88 volume % or more.

6. The growing medium of claim 1, wherein the growing medium has a water holding capacity according to ASTM D7367-14 of about 400 to 1000 weight %, based on the total weight of the growing medium.

7. The growing medium of claim 1, wherein about 62.3-79.5 weight % of the total weight of the fibrous tree bark and the fibrous wood components comprise fibers having a particle size equal to or less than about 2,360 μm and equal to or greater than 150 μm.

8. The growing medium of claim 1, wherein the growing medium comprises about 40 to 80 weight % fibrous tree bark and fibrous wood components, based on the total weight of the growing medium, comprising fibers having a particle size equal to or greater than 710 μm and equal to or less than 1180 μm.

9. The growing medium of claim 1, further comprising at least one of fertilizer(s), macronutrient(s), micronutrient(s), mineral(s), chemical binder(s), natural gum(s), interlocking manmade fiber(s), soil, or seed.

10. The growing medium of claim 1, wherein the fibrous wood components comprise wood chips, wood fiber, or both.

11. The growing medium of claim 1, wherein the fibrous tree bark comprises pine tree bark.

12. The growing medium of claim 1, wherein the growing medium comprises about 20 to about 70 weight % fibrous tree bark and about 30 to about 80 weight % fibrous wood components, based on the total weight of the growing medium.

13. The growing medium of claim 1, wherein about 70 to 96 weight % of the total weight of the growing medium comprises fibers having a particle size equal to or smaller than 4750 μm and equal to or larger than 150 μm.

14. The growing medium of claim 1, wherein the growing medium further comprises macronutrient(s), micronutrient(s), chemical binder(s), natural gum(s), interlocking manmade fiber(s), soil, and/or seed.

15. A growing medium comprising:
    fibrous tree bark and fibrous wood components,
    wherein about 10 to about 80 weight % of the growing medium, based on the total weight of the growing medium, comprises fibers having an average length to width ratio of about 14:1 to 31:1 and about 10 to 80 weight % of the growing medium, based on the total weight of the growing medium, comprises fibers having an average length to width ratio of about 39:1 to 56:1.

16. The growing medium of claim 15, wherein about 18 to about 30 weight % of the growing medium, based on the total weight of the growing medium, comprises fibers having an average length to width ratio of about 14:1 to 31:1 and about 18 to 30 weight % of the growing medium, based on the total weight of the growing medium, comprises fibers having an average length to width ratio of about 39:1 to 56:1.

17. The growing medium of claim 15, wherein about 70 to 96 weight % of the total weight of the growing medium comprises fibers having a particle size equal to or smaller than 4750 μm and equal to or larger than 150 μm.

18. The growing medium of claim 15, wherein the growing medium has a total porosity of about 88 volume % or more.

19. The growing medium of claim 15, wherein the growing medium has a water holding capacity according to ASTM D7367-14 of about 400 to 1000 weight %, based on the total weight of the growing medium.

20. The growing medium of claim 15, wherein the fibrous tree bark is present in an amount of about 5 to about 95 weight %, based on the total weight of the growing medium, and the fibrous wood components are present in an amount of about 5 to about 95 weight %, based on the total weight of the growing medium.

21. A growing medium comprising:
    about 5 to about 95 weight % fibrous tree bark, based on the total weight of the growing medium; and
    about 5 to about 95 weight % fibrous wood components, based on the total weight of the growing medium,
    wherein about 70 to 96 weight % of the growing medium, based on the total weight of the growing medium, comprises fibers having a particle size equal to or smaller than 4750 μm and equal to or larger than 150 μm, about 15 to about 40 weight % of the growing medium, based on the total weight of the growing medium, comprises fibers having an average length to width ratio of about 14:1 to 31:1, and about 15 to 40 weight % of the growing medium, based on the total weight of the growing medium, comprises fibers having an average length to width ratio of about 39:1 to 56:1 such that the growing medium has a dry bulk density of about 60 kg/m³ or lower and wet bulk density of about 120 kg/m³ or lower.

22. The growing medium of claim 21, wherein about 70 to 90 weight % of the total weight of the growing medium has a particle size equal to or smaller than 2360 μm and equal to or larger than about 150 μm.

23. The growing medium of claim 21, wherein the growing medium has a total porosity of about 88 volume % or more.

24. The growing medium of claim 21, wherein the growing medium has a water holding capacity according to ASTM D7367-14 of about 400 to 1000 weight %, based on the total weight of the growing medium.

25. The growing medium of claim 21, wherein about 62.3-79.5 weight % of the total weight of the fibrous tree bark and the fibrous wood components have a particle size equal to or less than about 2,360 μm and equal to or greater than 150 μm.

26. The growing medium of claim 21, wherein the growing medium comprises about 20 to about 70 weight % fibrous tree bark and about 30 to about 80 weight % fibrous wood components, based on the total weight of the growing medium.

27. The growing medium of claim 24, wherein the growing medium has a total porosity of about 88 volume % or more.

28. A growing medium comprising:
fibrous tree bark and fibrous wood components,
wherein about 70 to 96 weight % of the growing medium, based on the total weight of the growing medium, comprises fibers having a particle size equal to or smaller than 4750 μm and equal to or larger than 150 μm, about 18 to about 30 weight % of the growing medium, based on the total weight of the growing medium, comprises fibers having an average length to width ratio of about 14:1 to 31:1, and about 18 to 30 weight % of the growing medium, based on the total weight of the growing medium, comprises fibers having an average length to width ratio of about 39:1 to 56:1.

29. The growing medium of claim 28, wherein the fibrous tree bark is present in an amount of about 5 to about 95 weight %, based on the total weight of the growing medium, and the fibrous wood components are present in an amount of about 5 to about 95 weight %, based on the total weight of the growing medium.

30. A growing medium comprising:
a mixture of fibers comprising fibrous tree bark and fibrous wood,
wherein at least about 10 weight % of the fibers, based on the total weight of the mixture of fibers, have an average length to width ratio of at least about 9.

31. The growing medium of claim 30, wherein the average length to width ratio is no more than about 80.

32. The growing medium of claim 30, wherein the average length to width ratio is no more than about 40.

33. The growing medium of claim 30, wherein the growing medium has a dry bulk density of about 60 kg/m³ or lower and wet bulk density of about 120 kg/m³ or lower.

34. The growing medium of claim 30, wherein about 15 to about 40 weight % of the growing medium, based on the total weight of the growing medium, comprises fibers having an average length to width ratio of about 14:1 to 31:1 and about 15 to 40 weight % of the growing medium, based on the total weight of the growing medium, comprises fibers having an average length to width ratio of about 39:1 to 56:1.

35. The growing medium of claim 30, wherein about 70 to 96 weight % of the total weight of the growing medium comprises fibers having a particle size equal to or smaller than 4750 μm and equal to or larger than 150 μm.

36. The growing medium of claim 30, wherein the growing medium has a total porosity of about 88 volume % or more.

37. The growing medium of claim 30, wherein the growing medium has a water holding capacity according to ASTM D7367-14 of about 400 to 1000 weight %, based on the total weight of the growing medium.

38. The growing medium of claim 30, wherein about 62.3-79.5 weight % of the total weight of the fibrous tree bark and the fibrous wood components comprise fibers having a particle size equal to or less than about 2,360 μm and equal to or greater than 150 μm.

39. The growing medium of claim 30, wherein the growing medium comprises about 20 to about 70 weight % fibrous tree bark and about 30 to about 80 weight % fibrous wood components, based on the total weight of the growing medium.

40. A growing medium comprising:
a mixture of fibers comprising fibrous tree bark and fibrous wood,
wherein at least about 10 volume % of the fibers, based on the total volume of the mixture of fibers, have an average length to width ratio of at least about 9.

41. A growing medium comprising:
a mixture of fibers comprising fibrous tree bark and fibrous wood,
wherein about 10 to 80 weight % of the fibers, based on the total weight of the mixture of fibers, comprise a first portion of the fibers having a first average length to width ratio of at least about 9.

42. The growing medium of claim 41, wherein the first average length to width ratio is at least about 10.

43. The growing medium of claim 41, wherein the first average length to width ratio is at least about 14.

44. The growing medium of claim 42, wherein the first average length to width ratio is no more than about 80.

45. The growing medium of claim 43, wherein the first average length to width ratio is no more than about 40.

46. The growing medium of claim 41, wherein the first portion of the fibers comprise about 15 to 70 weight % of the fibers, based on the total weight of the mixture of fibers.

47. The growing medium of claim 41, wherein the first portion of the fibers comprise about 19 to 40 weight % of the fibers, based on the total weight of the mixture of fibers.

48. The growing medium of claim 41, wherein about 10 to 80 weight % of the fibers, based on the total weight of the mixture of fibers, comprise a second portion of fibers having a second average length to width ratio of at least about 20.

49. The growing medium of claim 48, wherein the second average length to width ratio is at least about 35.

50. The growing medium of claim 48, wherein the second average length to width ratio is at least about 39.

51. The growing medium of claim 48, wherein the second average length to width ratio is no more than about 80.

52. The growing medium of claim 48, wherein the second average length to width ratio is no more than about 60.

53. The growing medium of claim 47, wherein the second portion of the fibers comprise about 15 to 70 weight % of the fibers, based on the total weight of the mixture of fibers.

54. The growing medium of claim 47, wherein the second portion of the fibers comprise about 19 to 40 weight % of the fibers, based on the total weight of the mixture of fibers.

55. The growing medium of claim 54, wherein about 18 to about 30 weight % of the growing medium, based on the total weight of the growing medium, comprises fibers having an average length to width ratio of about 14:1 to 31:1 and about 18 to 30 weight % of the growing medium, based on the total weight of the growing medium, comprises fibers having an average length to width ratio of about 39:1 to 56:1.

56. The growing medium of claim 55, wherein about 70 to 96 volume % of the total volume growing medium comprises fibers having a particle size equal to or smaller than 4750 µm and equal to or larger than 150 µm.

57. The growing medium of claim 54, wherein the growing medium has a total porosity of about 88 volume % or more.

58. The growing medium of claim 57, wherein the growing medium has a water holding capacity according to ASTM D7367-14 of about 400 to 1000 weight %, based on the total weight of the growing medium.

59. The growing medium of claim 58, wherein the growing medium has a dry bulk density of about 60 kg/m$^3$ or lower and wet bulk density of about 120 kg/m$^3$ or lower.

60. A growing medium comprising:
a mixture of fibers comprising fibrous tree bark and fibrous wood,
wherein about 10 to 80 volume % of the fibers, based on the total volume of the mixture of fibers, comprise a first portion of the fibers having a first average length to width ratio of at least about 9.

61. The growing medium of claim 60, wherein about 10 to 80 volume % of the fibers, based on the total volume of the mixture of fibers, comprise a second portion of fibers having a second average length to width ratio of at least about 20.

62. A growing medium comprising:
a mixture of fibers comprising fibrous tree bark and fibrous wood;
a first portion of the fibers having a particle size of 1.18 to 2.35 mm, the first portion of the fibers having a first average length to width ratio of at least about 9.

63. The growing medium of claim 62, further comprising a second portion of the fibers having a particle size of 0.30 to 0.70 mm, the second portion of the fibers having a second average length to width ratio of at least about 20.

64. A growing medium comprising:
a mixture of fibrous wood components;
a first portion of the fibers having a particle size of 1.18 to 2.35 mm, the first portion of the fibers having a first average length to width ratio of at least about 9.

65. The growing medium of claim 64, further comprising a second portion of the fibers having a particle size of 0.30 to 0.70 mm, the second portion of the fibers having a second average length to width ratio of at least about 20.

66. A growing medium comprising:
about 5 to about 95 weight % fibrous tree bark, based on the total weight of the growing medium; and
about 5 to about 95 weight % fibrous wood components, based on the total weight of the growing medium,
wherein about 10 to about 80 weight % of the growing medium, based on the total weight of the growing medium, comprises fibers having an average length to width ratio of about 9:1 to 50:1 about 10 to 80 weight % of the growing medium, based on the total weight of the growing medium, comprises fibers having an average length to width ratio of about 30:1 to 70:1 such that the growing medium has a dry bulk density of about 60 kg/m$^3$ or lower and wet bulk density of about 120 kg/m$^3$ or lower.

67. The growing medium of claim 66, wherein about 10 to about 80 weight % of the growing medium, based on the total weight of the growing medium, comprises fibers having an average length to width ratio of about 13.5:1 to 34:1 and about 10 to 80 weight % of the growing medium, based on the total weight of the growing medium, comprises fibers having an average length to width ratio of 37:1 to 62:1.

68. A growing medium comprising:
fibrous tree bark and/or fibrous wood components, wherein about 10 to about 80 weight % of the growing medium, based on the total weight of the growing medium, comprises fibers having an average length to width ratio of about 14:1 to 31:1 and about 10 to 80 weight % of the growing medium comprises fibers having an average length to width ratio of about 39:1 to 56:1 such that the growing medium has a dry bulk density of about 60 kg/m$^3$ or lower and wet bulk density of about 120 kg/m$^3$ or lower.

69. The growing medium of claim 68, wherein the growing medium has a total porosity of about 88 volume % or more.

70. The growing medium of claim 69, wherein the growing medium has a water holding capacity according to ASTM D7367-14 of about 400 to 1000 weight %, based on the total weight of the growing medium.

* * * * *

UNITED STATES PATENT AND TRADEMARK OFFICE
CERTIFICATE OF CORRECTION

PATENT NO. : 10,266,457 B2
APPLICATION NO. : 15/400363
DATED : April 23, 2019
INVENTOR(S) : Kevin Scott Spittle et al.

Page 1 of 1

It is certified that error appears in the above-identified patent and that said Letters Patent is hereby corrected as shown below:

In the Claims

Column 25, Lines 49-50, Claim 4:
After "equal to or smaller than"
Delete "about".

Column 30, Line 28, Claim 67:
After "average length to width ratio of"
Delete "about".

Signed and Sealed this
Tenth Day of September, 2019

Andrei Iancu
*Director of the United States Patent and Trademark Office*